(12) United States Patent
Xiao et al.

(10) Patent No.: US 12,021,794 B2
(45) Date of Patent: Jun. 25, 2024

(54) COMMUNICATIONS METHOD AND APPARATUS

(71) Applicant: Huawei Technologies Co., Ltd., Shenzhen (CN)

(72) Inventors: Jiehua Xiao, Shenzhen (CN); Zhe Liu, Shanghai (CN); Hao Tang, Ottawa (CA); Zhang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 17/372,058

(22) Filed: Jul. 9, 2021

(65) Prior Publication Data

US 2021/0336755 A1 Oct. 28, 2021

Related U.S. Application Data

(63) Continuation of application No. PCT/CN2019/129460, filed on Dec. 27, 2019.

(30) Foreign Application Priority Data

Jan. 11, 2019 (CN) .......................... 201910028870.2

(51) Int. Cl.
*H04L 5/00* (2006.01)
*H04W 72/0453* (2023.01)
(Continued)

(52) U.S. Cl.
CPC .......... *H04L 5/0098* (2013.01); *H04L 5/0092* (2013.01); *H04W 72/0453* (2013.01); *H04W 72/23* (2023.01); *H04W 72/54* (2023.01)

(58) Field of Classification Search
CPC . H04W 72/0453; H04W 72/23; H04W 72/54; H04W 36/06; H04W 36/0069;
(Continued)

(56) References Cited

U.S. PATENT DOCUMENTS 9,980,315 B2 5/2018 Yu et al.
2017/0048917 A1* 2/2017 Kim ..................... H04W 48/16
(Continued)

FOREIGN PATENT DOCUMENTS

CN 102932908 A 2/2013
CN 105589506 A 5/2016
(Continued)

OTHER PUBLICATIONS

"Open Issues on CA," 3GPP TSG RAN WG1 Meeting #91, R1-1720694, Reno, NV, USA, pp. 1-14, XP051370155, 3rd Generation Partnership Project, Valbonne, France (Nov. 27-Dec. 1, 2017).
(Continued)

*Primary Examiner* — Kwang B Yao
*Assistant Examiner* — Syed M Bokhari
(74) *Attorney, Agent, or Firm* — Leydig, Voit & Mayer, Ltd.

(57) ABSTRACT

Embodiments of this application provide a communications method and apparatus, and relate to the field of communications technologies, to reduce power consumption of a terminal. The method includes: receiving information about one or more cell groups, where one cell group includes one first cell and at least one second cell; and for the cell group, determining carrier bandwidth part BWP switching or a deactivated state of the at least one second cell in the cell group based on BWP switching or a deactivated state of the first cell in the cell group. The method provided in the embodiments of this application may be applied to a carrier aggregation scenario.

20 Claims, 14 Drawing Sheets

(51) Int. Cl.
  *H04W 72/23* (2023.01)
  *H04W 72/54* (2023.01)
(58) Field of Classification Search
  CPC ......... H04W 52/0248; H04W 52/0258; H04W 52/0219; H04W 36/0055; H04W 36/165; H04L 5/0098; H04L 5/0092; Y02D 30/70
  USPC ........................................................ 370/329
  See application file for complete search history.

(56) References Cited

U.S. PATENT DOCUMENTS

| | | | |
|---|---|---|---|
| 2018/0367386 | A1 | 12/2018 | Liao |
| 2019/0158229 | A1* | 5/2019 | Wei ........................ H04L 1/1812 |
| 2019/0357262 | A1* | 11/2019 | Cirik ..................... H04W 76/27 |
| 2020/0053613 | A1* | 2/2020 | Cirik ..................... H04W 76/19 |
| 2021/0273771 | A1* | 9/2021 | Takeda ................ H04L 27/2602 |

FOREIGN PATENT DOCUMENTS

| | | |
|---|---|---|
| CN | 105991212 A | 10/2016 |
| CN | 108781377 A | 11/2018 |
| CN | 109076553 A | 12/2018 |
| CN | 109076620 A | 12/2018 |
| CN | 109152019 A | 1/2019 |
| CN | 110012554 A | 7/2019 |
| CN | 110166193 A | 8/2019 |
| EP | 3685623 A1 | 7/2020 |
| WO | 2018121621 A1 | 7/2018 |
| WO | 2018203717 A1 | 11/2018 |
| WO | 2019083277 A1 | 5/2019 |

OTHER PUBLICATIONS

"Potential Techniques for UE Power Saving," 3GPP TSG-RAN WG1 #96, R1-1903016, Athens, Greece, Total 33 pages, XP051600713, 3rd Generation Partnership Project, Valbonne, France (Feb. 25-Mar. 1, 2019).

Rapporteur (Nokia), "Miscellaneous Corrections and Additions," 3GPP TSG-RAN WG2 Meeting #101, Athens, Greece, R2-1803877, total 35 pages, 3rd Generation Partnership Project, Valbonne, France (Feb. 26-Mar. 2, 2018).

Samsung, "Corrections for BWP switching," 3GPP TSG-RAN WG2 NR 2018AH#1 Meeting, Vancouver, Canada, R2-1801467, total 7 pages, 3rd Generation Partnership Project, Valbonne, France (Jan. 22-26, 2018).

Huawei, HiSilicon, "General considerations on UE power saving in Rel-16," 3GPP TSG RAN WG1 Meeting #94, Gothenburg, Sweden, R1-1809333, total 5 pages, 3rd Generation Partnership Project, Valbonne, France (Aug. 20-24, 2018).

"3rd Generation Partnership Project; Technical Specification Group Radio Access Network; NR; Physical channels and modulation (Release 15)," 3GPP TS 38.211 V15.3.0, total 96 pages, 3rd Generation Partnership Project, Valbonne, France (Sep. 2018).

MediaTek Inc., "Remaining Issues on Bandwidth Part and Carrier Aggregation in NR," 3GPP TSG RAN WG1 Meeting #94, Gothenburg, Sweden, R1-1808270, total 8 pages, 3rd Generation Partnership Project, Valbonne, France (Aug. 20-24, 2018).

Huawei, HiSilicon, "RRC triggered BWP activation and initial BWP configuration," 3GPP TSG-RAN2 Meeting#102, Busan, South Korea, R2-1807461, total 9 pages, 3rd Generation Partnership Project, Valbonne, France (May 21-25, 2018).

"3rd Generation Partnership Project; Technical Specification Group Radio Access Network; NR; Physical layer procedures for data (Release 15)," 3GPP TS 38.214 V15.3.0, total 96 pages, 3rd Generation Partnership Project, Valbonne, France (Sep. 2018).

"3rd Generation Partnership Project; Technical Specification Group Radio Access Network; NR; Radio Resource Control (RRC) protocol specification(Release 15)," 3GPP TS 38.331 V15.3.0, total 445 pages, 3rd Generation Partnership Project, Valbonne, France (Sep. 2018).

Ericsson, "Interruption Requirements on NR Serving Cells due to BWP Reconfiguration," Change Request, 3GPP TSG-RAN4 Meeting #86bis, Melbourne, Australia, R4-1805036, total 3 pages, 3rd Generation Partnership Project, Valbonne, France (Apr. 16-20, 2018).

* cited by examiner

COMMUNICATIONS METHOD AND APPARATUS

CROSS-REFERENCE TO RELATED APPLICATIONS

This application is a continuation of International Application No. PCT/CN2019/129460, filed on Dec. 27, 2019, which claims priority to Chinese Patent Application No. 201910028870.2, filed on Jan. 11, 2019. The disclosures of the aforementioned applications are hereby incorporated by reference in their entireties.

TECHNICAL FIELD

Embodiments of this application relate to the field of communications technologies, and in particular, to a communications method and apparatus.

BACKGROUND

In the new radio (NR) of the fifth generation (5G) mobile communication, a base station may indicate a carrier bandwidth part (BWP) for a terminal, so that the base station and the terminal transmit data to each other through the BWP.
To further improve a throughput of a 5G system, carrier aggregation (CA) is introduced to the NR. To be specific, a plurality of contiguous or non-contiguous spectrums may be aggregated for use. For each serving cell, one or more BWPs may be configured for a terminal of the serving cell. The configured BWP may be a large-bandwidth BWP, to improve a service transmission capability of the terminal. Alternatively, the configured BWP may be a small-bandwidth BWP, so that when service traffic is relatively light, data amounts of radio frequency processing and baseband processing by the terminal can be reduced, thereby reducing power consumption of the terminal.
In a CA scenario, as a quantity of service requirements of the terminal continuously increases, data that needs to be processed by the terminal continuously increases, and power consumption is relatively large. Therefore, a method for reducing power consumption of the terminal in the CA scenario needs to be urgently proposed.

SUMMARY

Embodiments of this application provide a communications method and apparatus, to reduce power consumption of a terminal in a CA scenario.
To achieve the foregoing objective, the following technical solutions are used in the embodiments of this application:
According to a first aspect, embodiments of this application provide a communications method. The method may be applied to a terminal or a chip in a terminal. The method includes: receiving information about one or more cell groups, where one cell group includes one first cell and at least one second cell; and for the cell group, determining carrier bandwidth part BWP switching or a deactivated state of the second cell in the cell group based on BWP switching or a deactivated state of the first cell in the cell group. In this way, the cell group is configured, and the BWP switching or the deactivated state of the first cell in the cell group is associated with the BWP switching or the deactivated state of the second cell in the cell group, so that the BWP switching or deactivating of the second cell is performed based on the BWP switching or the deactivated state of the first cell. For example, when the terminal is in a power saving state in the first cell, the terminal is also in a power saving state in the second cell in the same cell group, so that power consumption of the terminal can be further reduced.
In the embodiments of this application, the first cell may be referred to as a reference cell or another name. This is not limited in the embodiments of this application.
In a possible design, the determining carrier bandwidth part BWP switching or a deactivated state of the second cell in the cell group based on BWP switching or a deactivated state of the first cell in the cell group may be specifically implemented as the following step:
if it is determined to switch a BWP of the first cell in the cell group from a first BWP of the first cell to a second BWP of the first cell, switching a BWP of the second cell in the cell group from a first BWP of the second cell to a second BWP of the second cell.
The first BWP is a non-default default BWP, and the second BWP is a default BWP. Alternatively, the first BWP is a default BWP, and the second BWP is a non-default BWP.
Optionally, the default BWP is an active BWP in which the terminal works after a BWP fallback timer expires. When the default BWP is described below, reference may be made to the description herein.
Optionally, if the first BWP is a non-default BWP, and the second BWP is a default BWP, if it is determined to switch the BWP of the first cell in the cell group from a non-default BWP of the first cell to a default BWP of the first cell, the method includes switching the BWP of the second cell in the cell group from a non-default BWP of the second cell to a default BWP of the second cell.
In this way, as the BWP of the first cell in the cell group falls back from the non-default BWP to the default BWP, the BWP of the second cell in the same cell group also falls back from the non-default BWP to the default BWP. This improves robustness of BWP switching of the terminal. In addition, when the default BWP is a small-bandwidth BWP, as the BWP of the first cell in the cell group is switched from a large-bandwidth BWP to the small-bandwidth BWP, the BWP of the second cell in the same cell group is also switched from a large-bandwidth BWP to a small-bandwidth BWP. Generally, switching the BWP of the first cell to the small-bandwidth BWP indicates that service traffic of the terminal is relatively light. In this case, switching the BWP of the second cell in the same cell group to the small-bandwidth BWP can reduce workloads of radio frequency processing and baseband processing by the terminal. Therefore, power consumption of the terminal is reduced.
Optionally, if the first BWP is a default BWP, and the second BWP is a non-default BWP, if it is determined to switch the BWP of the first cell in the cell group from a default BWP of the first cell to a non-default BWP of the first cell, the terminal switches the BWP of the second cell in the cell group from a default BWP of the second cell to a non-default BWP of the second cell.
In this way, as the BWP of the first cell in the cell group is switched from the default BWP to the non-default BWP, the BWP of the second cell in the same cell group is also switched from the default BWP to the non-default BWP. This can increase available bandwidth resources of the terminal, and improve data transmission performance of the terminal.
In a possible design, the non-default BWP is a preconfigured BWP or a non-default BWP used last time.
Correspondingly, the switching the BWP of the second cell from the default BWP to the non-default BWP may be implemented as: switching the BWP of the second cell from the default BWP to the preconfigured non-default BWP. The preconfigured non-default BWP may be preconfigured by a base station for the terminal by using RRC signaling or other signaling. In this way, the base station and the terminal can communicate with each other through the preconfigured non-default BWP.

Alternatively, the switching the BWP of the second cell from the default BWP to the non-default BWP may be implemented as: switching the BWP of the second cell from the default BWP to the non-default BWP used last time. For example, referring to FIG. 13, the terminal currently works on a default BWP 6, and before that, the terminal works on a non-default BWP 5. If a BWP of the terminal in a cell 2 needs to be switched to a non-default BWP, the terminal may switch the BWP of the terminal in the cell 2 from the default BWP 6 to the non-default BWP 5 used last time. Correspondingly, the base station switches the BWP of the terminal in the cell 2 from the default BWP 6 to the non-default BWP 5 used in last communication with the terminal.

In a possible design, the switching a BWP of the second cell in the cell group from a first BWP of the second cell to a second BWP of the second cell may be specifically implemented as:

receiving a first switching indication of the second cell, where the first switching indication carries a target non-default BWP; and switching the BWP of the second cell from a default BWP of the second cell to the target non-default BWP. In this way, the second cell in the cell group can flexibly indicate the target non-default BWP to which the terminal needs to switch the BWP of the second cell, so that the terminal can flexibly switch the BWP of the second cell to the required non-default BWP for communication.

In a possible design, the determining BWP switching or a deactivated state of the second cell in the cell group based on BWP switching or a deactivated state of the first cell in the cell group may be alternatively implemented as: if it is determined to deactivate the first cell in the cell group, deactivating the second cell in the cell group.

In a possible design, the method further includes: receiving a first indication message, where the first indication message is used to enable deactivating the second cell in the cell group when the first cell in the cell group is deactivated.

In a possible design, the terminal receives a deactivation indication specific to the first cell from an access network device, to determine whether the first cell needs to be deactivated.

Optionally, the deactivation indication includes a media access control element MAC CE, radio resource control RRC, or downlink control information DCI.

Optionally, after the deactivation indication specific to the first cell in the cell group is received or after a deactivation timer of the first cell expires, the terminal stops sending channel state information CSI.

"Receiving" the deactivation indication described in the embodiments of this application may mean receiving and successfully parsing the deactivation indication.

In a possible design, the determining BWP switching or a deactivated state of the second cell in the cell group based on BWP switching or a deactivated state of the first cell in the cell group may be specifically implemented as: if it is determined to switch a BWP of the first cell in the cell group from a non-default BWP of the first cell to a default BWP of the first cell, deactivating the second cell in the cell group.

In a possible design, the terminal receives a second indication message from an access network device, where the second indication message is used to enable deactivating the second cell in the cell group when the BWP of the first cell in the cell group is switched from the non-default BWP to the default BWP.

In a possible design, the terminal receives a BWP switching indication from an access network device, where the BWP switching indication is used to indicate to switch the BWP of the first cell from the non-default BWP of the first cell to the default BWP of the first cell.

Optionally, the BWP switching indication includes any one of a MAC CE, RRC, or DCI.

In a possible design, after the BWP switching indication is received or after a BWP fallback timer of the first cell expires, the terminal stops sending channel state information CSI of the second cell in the cell group.

"Receiving" the BWP switching indication described in the embodiments of this application may mean receiving and successfully parsing the BWP switching indication.

According to a second aspect, this application provides a communications method. The method is applied to an access network device or a chip in an access network device. The method includes: sending information about one or more cell groups, where one cell group includes one first cell and at least one second cell; and for the cell group, determining carrier bandwidth part BWP switching or a deactivated state of the second cell in the cell group based on BWP switching or a deactivated state of the first cell in the cell group.

In a possible design, the determining carrier bandwidth part BWP switching or a deactivated state of the second cell in the cell group based on BWP switching or a deactivated state of the first cell in the cell group may be specifically implemented as: if it is determined to switch a BWP of the first cell in the cell group from a first BWP of the first cell to a second BWP of the first cell, switching a BWP of the second cell in the cell group from a first BWP to a second BWP.

In the embodiments of this application, the first cell may be referred to as a reference cell or another name. This is not limited in the embodiments of this application.

In a possible design, the first BWP is a non-default default BWP, and the second BWP is a default BWP.

In a possible design, the first BWP is a default BWP, and the second BWP is a non-default BWP.

In a possible design, the non-default BWP is a preconfigured BWP or a non-default BWP used last time.

Correspondingly, the switching the BWP of the second cell from the default BWP to the non-default BWP may be implemented as: switching the BWP of the second cell from the default BWP to the preconfigured non-default BWP. The preconfigured non-default BWP may be preconfigured by a base station for a terminal by using RRC signaling or other signaling. In this way, the base station and the terminal can communicate with each other through the preconfigured non-default BWP.

Alternatively, the switching the BWP of the second cell from the default BWP to the non-default BWP may be implemented as: switching the BWP of the second cell from the default BWP to the non-default BWP used last time. For example, referring to FIG. 13, the terminal currently works on a default BWP 6, and before that, the terminal works on a non-default BWP 5. If a BWP of the terminal in a cell 2 needs to be switched to a non-default BWP, the BWP of the terminal in the cell 2 may be switched from the default BWP 6 to the non-default BWP 5 used last time. Correspondingly, the base station switches the BWP of the terminal in the cell 2 from the default BWP 6 to the non-default BWP 5 used in last communication with the terminal.

In a possible design, the switching a BWP of the second cell in the cell group from a first BWP to a second BWP may be specifically implemented as: sending a first switching indication, where the first switching indication carries a target non-default BWP; and switching the BWP of the second cell in the cell group from a default BWP of the second cell to the target non-default BWP.

In a possible design, the determining BWP switching or a deactivated state of the second cell in the cell group based on BWP switching or a deactivated state of the first cell in the cell group may be specifically implemented as: if it is determined to deactivate the first cell in the cell group, deactivating the second cell in the cell group.

In a possible design, the access network device sends a first indication message to the terminal, where the first indication message is used to enable deactivating the second cell in the cell group when the first cell in the cell group is deactivated.

In a possible design, the access network device sends a deactivation indication specific to the first cell to the terminal, to indicate whether the first cell needs to be deactivated.

Optionally, the deactivation indication includes a media access control element MAC CE, radio resource control RRC, or downlink control information DCI.

In a possible design, the determining BWP switching or a deactivated state of the second cell in the cell group based on BWP switching or a deactivated state of the first cell in the cell group may be specifically implemented as: if it is determined to switch a BWP of the first cell in the cell group from a non-default BWP of the first cell to a default BWP of the first cell, deactivating the second cell in the cell group.

In a possible design, the access network device sends a second indication message to the terminal, where the indication message is used to enable deactivating the second cell in the cell group when the BWP of the first cell in the cell group is switched from the non-default BWP to the default BWP.

In a possible design, the access network device sends a BWP switching indication to the terminal, where the BWP switching indication is used to indicate whether the BWP of the first cell needs to be switched from the non-default BWP of the first cell to the default BWP of the first cell.

Optionally, the BWP switching indication includes any one of a MAC CE, RRC, or DCI.

According to a third aspect, embodiments of this application provide a communications apparatus. The apparatus may be a terminal, or may be an apparatus that can support a terminal in implementing a function of the terminal. The apparatus may be used together with the terminal, for example, may be an apparatus in the terminal (for example, a chip in the terminal). The apparatus may include a receiving module, a determining module, and a sending module. These modules may perform corresponding functions performed by the terminal in any design example of the first aspect. Details are as follows:

The receiving module is configured to receive information about one or more cell groups, where one cell group includes one first cell and at least one second cell. The determining module is configured to: for the cell group, determine carrier bandwidth part BWP switching or a deactivated state of the second cell in the cell group based on BWP switching or a deactivated state of the first cell in the cell group. In this way, the cell group is configured, and the BWP switching or the deactivated state of the first cell in the cell group is associated with the BWP switching or the deactivated state of the second cell in the cell group, so that the BWP switching or deactivating of the second cell is performed based on the BWP switching or the deactivated state of the first cell. For example, when the terminal is in a power saving state in the first cell, the terminal is also in a power saving state in the second cell in the same cell group, so that power consumption of the terminal can be further reduced.

In a possible design, that the determining module is configured to determine carrier bandwidth part BWP switching or a deactivated state of the second cell in the cell group based on BWP switching or a deactivated state of the first cell in the cell group may be specifically: The determining module is configured to: if it is determined to switch a BWP of the first cell in the cell group from a first BWP of the first cell to a second BWP of the first cell, switch a BWP of the second cell in the cell group from a first BWP of the second cell to a second BWP of the second cell.

The first BWP is a non-default default BWP, and the second BWP is a default BWP. Alternatively, the first BWP is a default BWP, and the second BWP is a non-default BWP.

Optionally, if the first BWP is a non-default BWP, and the second BWP is a default BWP, the determining module is specifically configured to: if it is determined to switch the BWP of the first cell in the cell group from a non-default BWP of the first cell to a default BWP of the first cell, switch the BWP of the second cell in the cell group from a non-default BWP of the second cell to a default BWP of the second cell.

In this way, as the BWP of the first cell in the cell group falls back from the non-default BWP to the default BWP, the BWP of the second cell in the same cell group also falls back from the non-default BWP to the default BWP. This improves robustness of BWP switching of the terminal. In addition, when the default BWP is a small-bandwidth BWP, as the BWP of the first cell in the cell group is switched from a large-bandwidth BWP to the small-bandwidth BWP, the BWP of the second cell in the same cell group is also switched from a large-bandwidth BWP to a small-bandwidth BWP. Generally, switching the BWP of the first cell to the small-bandwidth BWP indicates that service traffic of the terminal is relatively light. In this case, switching the BWP of the second cell in the same cell group to the small-bandwidth BWP can reduce workloads of radio frequency processing and baseband processing by the terminal. Therefore, power consumption of the terminal is reduced.

Optionally, if the first BWP is a default BWP, and the second BWP is a non-default BWP, the determining module is specifically configured to: if it is determined to switch the BWP of the first cell in the cell group from a default BWP of the first cell to a non-default BWP of the first cell, switch the BWP of the second cell in the cell group from a default BWP of the second cell to a non-default BWP of the second cell.

In this way, as the BWP of the first cell in the cell group is switched from the default BWP to the non-default BWP, the BWP of the second cell in the same cell group is also switched from the default BWP to the non-default BWP. This can increase available bandwidth resources of the terminal, and improve data transmission performance of the terminal.

In a possible design, the non-default BWP is a preconfigured BWP or a non-default BWP used last time.

Correspondingly, that the determining module is configured to switch the BWP of the second cell from a default BWP to a non-default BWP may be specifically: The determining module is configured to switch the BWP of the second cell from the default BWP to the preconfigured non-default BWP. The preconfigured non-default BWP may be preconfigured by a base station for the terminal by using RRC signaling or other signaling. In this way, the base station and the terminal can communicate with each other through the preconfigured non-default BWP.

Alternatively, that the determining module is configured to switch the BWP of the second cell from a default BWP to a non-default BWP may be: The determining module is configured to switch the BWP of the second cell from the default BWP to the non-default BWP used last time. For example, referring to FIG. 13, the terminal currently works on a default BWP 6, and before that, the terminal works on a non-default BWP 5. If a BWP of the terminal in a cell 2 needs to be switched to a non-default BWP, the terminal may switch the BWP of the terminal in the cell 2 from the default BWP 6 to the non-default BWP 5 used last time. Correspondingly, the base station switches the BWP of the terminal in the cell 2 from the default BWP 6 to the non-default BWP 5 used in last communication with the terminal.

In a possible design, that the determining module is configured to switch a BWP of the second cell in the cell group from a first BWP of the second cell to a second BWP of the second cell may be specifically: The determining module is configured to control the receiving module to receive a first switching indication of the second cell, where the first switching indication carries a target non-default BWP; and switch the BWP of the second cell from a default BWP of the second cell to the target non-default BWP. In this way, the second cell in the cell group can flexibly indicate the target non-default BWP to which the terminal needs to switch the BWP of the second cell, so that the terminal can flexibly switch the BWP of the second cell to the required non-default BWP for communication.

In a possible design, that the determining module is configured to determine BWP switching or a deactivated state of the second cell in the cell group based on BWP switching or a deactivated state of the first cell in the cell group may be alternatively: The determining module is configured to: if it is determined to deactivate the first cell in the cell group, deactivate the second cell in the cell group.

In a possible design, the receiving module is further configured to receive a first indication message, where the first indication message is used to enable deactivating the second cell in the cell group when the first cell in the cell group is deactivated.

In a possible design, the receiving module is further configured to receive a deactivation indication specific to the first cell from an access network device, to determine whether the first cell needs to be deactivated.

Optionally, the deactivation indication includes a media access control element MAC CE, radio resource control RRC, or downlink control information DCI.

In a possible design, the sending module is configured to: after the deactivation indication specific to the first cell in the cell group is received or after a deactivation timer of the first cell expires, stop sending channel state information CSI.

"Receiving" the deactivation indication described in the embodiments of this application may mean receiving and successfully parsing the deactivation indication.

In a possible design, that the determining module is configured to determine BWP switching or a deactivated state of the second cell in the cell group based on BWP switching or a deactivated state of the first cell in the cell group may be specifically: The determining module is configured to: if it is determined to switch a BWP of the first cell in the cell group from a non-default BWP of the first cell to a default BWP of the first cell, deactivate the second cell in the cell group.

In a possible design, the receiving module is further configured to receive a second indication message from an access network device, where the second indication message is used to enable deactivating the second cell in the cell group when the BWP of the first cell in the cell group is switched from the non-default BWP to the default BWP.

In a possible design, the receiving module is further configured to receive a BWP switching indication from the access network device, where the BWP switching indication is used to indicate to switch the BWP of the first cell from the non-default BWP of the first cell to the default BWP of the first cell.

Optionally, the BWP switching indication includes any one of a MAC CE, RRC, or DCI.

In a possible design, the sending module is configured to: after the BWP switching indication is received or after a BWP fallback timer of the first cell expires, stop sending CSI of the second cell in the cell group.

"Receiving" the BWP switching indication described in the embodiments of this application may mean receiving and successfully parsing the BWP switching indication.

According to a fourth aspect, this application provides a communications apparatus. The apparatus may be an access network device, or may be an apparatus that can support an access network device in implementing a function of the access network device. The apparatus may be used together with the access network device, for example, may be an apparatus in the access network device (for example, a chip system in the access network device). The apparatus includes a sending module and a determining module, and the modules may perform corresponding functions performed by the access network device in any design example of the second aspect. Details are as follows:

The sending module is configured to send information about one or more cell groups, where one cell group includes one first cell and at least one second cell. The determining module is configured to: for the cell group, determine carrier bandwidth part BWP switching or a deactivated state of the second cell in the cell group based on BWP switching or a deactivated state of the first cell in the cell group.

In a possible design, that the determining module is configured to determine carrier bandwidth part BWP switching or a deactivated state of the second cell in the cell group based on BWP switching or a deactivated state of the first cell in the cell group may be specifically: The determining module is configured to: if it is determined to switch a BWP of the first cell in the cell group from a first BWP of the first cell to a second BWP of the first cell, switch a BWP of the second cell in the cell group from a first BWP to a second BWP.

In a possible design, the first BWP is a non-default default BWP, and the second BWP is a default BWP.

In a possible design, the first BWP is a default BWP, and the second BWP is a non-default BWP.

In a possible design, the non-default BWP is a preconfigured BWP or a non-default BWP used last time.

Correspondingly, that the determining module is configured to switch the BWP of the second cell from a default BWP to a non-default BWP may be: The determining module is configured to switch the BWP of the second cell from the default BWP to the preconfigured non-default BWP. The preconfigured non-default BWP may be preconfigured by a base station for a terminal by using RRC signaling or other signaling. In this way, the base station and the terminal can communicate with each other through the preconfigured non-default BWP.

Alternatively, that the determining module is configured to switch the BWP of the second cell from a default BWP to a non-default BWP may be: The determining module is configured to switch the BWP of the second cell from the default BWP to the non-default BWP used last time. For example, referring to FIG. 13, the terminal currently works on a default BWP 6, and before that, the terminal works on a non-default BWP 5. If a BWP of the terminal in a cell 2 needs to be switched to a non-default BWP, the BWP of the terminal in the cell 2 may be switched from the default BWP 6 to the non-default BWP 5 used last time. Correspondingly, the base station switches the BWP of the terminal in the cell 2 from the default BWP 6 to the non-default BWP 5 used in last communication with the terminal.

In a possible design, that the determining module is configured to switch a BWP of the second cell in the cell group from a first BWP to a second BWP may be specifically: The determining module is configured to control the sending module to send a first switching indication, where the first switching indication carries a target non-default BWP; and switch the BWP of the second cell in the cell group from a default BWP of the second cell to the target non-default BWP.

In a possible design, that the determining module is configured to determine BWP switching or a deactivated state of the second cell in the cell group based on BWP switching or a deactivated state of the first cell in the cell group may be specifically: The determining module is configured to: if it is determined to deactivate the first cell in the cell group, deactivate the second cell in the cell group.

In a possible design, the sending module is further configured to send a first indication message to the terminal, where the first indication message is used to enable deactivating the second cell in the cell group when the first cell in the cell group is deactivated.

In a possible design, the sending module is further configured to send a deactivation indication specific to the first cell to the terminal, to indicate whether the first cell needs to be deactivated.

Optionally, the deactivation indication includes a media access control element MAC CE, radio resource control RRC, or downlink control information DCI.

In a possible design, that the determining module is configured to determine BWP switching or a deactivated state of the second cell in the cell group based on BWP switching or a deactivated state of the first cell in the cell group may be specifically: The determining module is configured to: if it is determined to switch a BWP of the first cell in the cell group from a non-default BWP of the first cell to a default BWP of the first cell, deactivate the second cell in the cell group.

In a possible design, the sending module is further configured to send a second indication message to the terminal, where the indication message is used to enable deactivating the second cell in the cell group when the BWP of the first cell in the cell group is switched from the non-default BWP to the default BWP.

In a possible design, the sending module is further configured to send a BWP switching indication to the terminal, where the BWP switching indication is used to indicate whether the BWP of the first cell needs to be switched from the non-default BWP of the first cell to the default BWP of the first cell.

Optionally, the BWP switching indication includes any one of a MAC CE, RRC, or DCI.

According to a fifth aspect, embodiments of this application further provides an apparatus. The apparatus includes a processor, configured to implement the function of the terminal in the method described in the first aspect. The apparatus may be a terminal, or may be a chip system, or the like. The apparatus may further include a memory, configured to store instructions and/or data. The memory is coupled to the processor. The processor may execute the instructions stored in the memory, to implement the function of the terminal in the method described in the first aspect. The apparatus may further include a communications interface, and the communications interface is used by the apparatus to communicate with another device. For example, the another device is an access network device.

In a possible design, the apparatus includes:

the communications interface, configured to receive information about one or more cell groups, where one cell group includes one first cell and at least one second cell;

the memory, configured to store instructions; and the processor, configured to: for the cell group, determine carrier bandwidth part BWP switching or a deactivated state of the second cell in the cell group based on BWP switching or a deactivated state of the first cell in the cell group.

In a possible design, that the processor is configured to determine carrier bandwidth part BWP switching or a deactivated state of the second cell in the cell group based on BWP switching or a deactivated state of the first cell in the cell group includes: The processor is configured to: if it is determined to switch a BWP of the first cell in the cell group from a first BWP of the first cell to a second BWP of the first cell, switch a BWP of the second cell in the cell group from a first BWP of the second cell to a second BWP of the second cell.

In a possible design, for the first BWP and the second BWP, refer to related descriptions in the first aspect to the fourth aspect. Details are not described herein again.

In a possible design, the non-default BWP is a preconfigured BWP or a non-default BWP used last time.

In a possible design, that the processor is configured to switch a BWP of the second cell in the cell group from a first BWP of the second cell to a second BWP of the second cell includes: The processor is configured to receive a first switching indication of the second cell through the communications interface, where the first switching indication carries a target non-default BWP; and switch the BWP of the second cell from a default BWP of the second cell to the target non-default BWP.

In a possible design, the determining BWP switching or a deactivated state of the second cell in the cell group based on BWP switching or a deactivated state of the first cell in the cell group includes: if it is determined to deactivate the first cell in the cell group, deactivating the second cell in the cell group.

In a possible design, the communications interface is further configured to: after a deactivation indication of the first cell in the cell group is received or after a deactivation timer of the first cell expires, stop sending channel state information CSI, where the deactivation indication is used to indicate to deactivate the first cell.

In a possible design, for a detailed description of the deactivation indication, refer to the first aspect to the fourth aspect.

In a possible design, that the processor is configured to determine BWP switching or a deactivated state of the second cell in the cell group based on BWP switching or a deactivated state of the first cell in the cell group includes: The processor is configured to: if it is determined to switch a BWP of the first cell in the cell group from a non-default BWP of the first cell to a default BWP of the first cell, deactivate the second cell in the cell group.

In a possible design, the communications interface is further configured to receive an indication message, where the indication message is used to enable deactivating the second cell in the cell group when the BWP of the first cell in the cell group is switched from the non-default BWP to the default BWP.

In a possible design, the communications interface is further configured to: after a BWP switching indication is received or after a BWP fallback timer of the first cell expires, stop sending CSI of the second cell in the cell group, where the BWP switching indication is used to switch the BWP of the first cell from the non-default BWP of the first cell to the default BWP of the first cell.

In a possible design, the BWP switching indication includes a MAC CE, RRC, or DCI.

According to a sixth aspect, embodiments of this application further provide an apparatus. The apparatus includes a processor, configured to implement the function of the access network device in the method described in the second aspect. The apparatus may be an access network device, or may be a chip system, or the like. The apparatus may further include a memory, configured to store instructions and/or data. The memory is coupled to the processor. The processor may execute the instructions stored in the memory, to implement the function of the access network device in the method described in the second aspect. The apparatus may further include a communications interface, and the communications interface is used by the apparatus to communicate with another device. For example, the another device is a terminal. In a possible design, the apparatus includes:

the communications interface, configured to send information about one or more cell groups, where one cell group includes one first cell and at least one second cell;

the memory, configured to store program instructions; and the processor, configured to: for the cell group, determine carrier bandwidth part BWP switching or a deactivated state of the second cell in the cell group based on BWP switching or a deactivated state of the first cell in the cell group.

In a possible design, that the processor is configured to determine carrier bandwidth part BWP switching or a deactivated state of the second cell in the cell group based on BWP switching or a deactivated state of the first cell in the cell group includes: The processor is configured to: if it is determined to switch a BWP of the first cell in the cell group from a first BWP of the first cell to a second BWP of the first cell, switch a BWP of the second cell in the cell group from a first BWP to a second BWP.

In a possible design, for descriptions of the first BWP and the second BWP, refer to descriptions of the foregoing aspects.

In a possible design, the non-default BWP is a preconfigured BWP or a non-default BWP used last time.

In a possible design, that the processor is configured to switch a BWP of the second cell in the cell group from a first BWP to a second BWP includes: The processor is configured to send a first switching indication through the communications interface, where the first switching indication carries a target non-default BWP; and switch the BWP of the second cell in the cell group from a default BWP of the second cell to the target non-default BWP.

In a possible design, that the processor is configured to determine BWP switching or a deactivated state of the second cell in the cell group based on BWP switching or a deactivated state of the first cell in the cell group includes: The processor is configured to: if it is determined to deactivate the first cell in the cell group, deactivate the second cell in the cell group.

In a possible design, that the processor is configured to determine BWP switching or a deactivated state of the second cell in the cell group based on BWP switching or a deactivated state of the first cell in the cell group includes: The processor is configured to: if it is determined to switch a BWP of the first cell in the cell group from a non-default BWP of the first cell to a default BWP of the first cell, deactivate the second cell in the cell group.

In a possible design, the communications interface is further configured to send an indication message, where the indication message is used to enable deactivating the second cell in the cell group when the BWP of the first cell in the cell group is switched from the non-default BWP to the default BWP.

According to a seventh aspect, embodiments of this application further provide a computer-readable storage medium, including instructions, and when the instructions are run on a computer, the computer is enabled to perform the method according to the first aspect or the second aspect.

According to an eighth aspect, embodiments of this application further provide a computer program product, including instructions, and when the instructions are run on a computer, the computer is enabled to perform the method according to the first aspect or the second aspect.

According to a ninth aspect, embodiments of this application provide a chip system. The chip system includes a processor, may further include a memory, and is configured to implement the function of the terminal or the access network device in the foregoing methods. The chip system may include a chip, or may include a chip and another discrete device.

According to a tenth aspect, embodiments of this application provide a system. The system includes the apparatuses according to the third aspect and the fourth aspect, or includes the apparatuses according to the fifth aspect and the sixth aspect.

DESCRIPTION OF EMBODIMENTS

Figure 1:
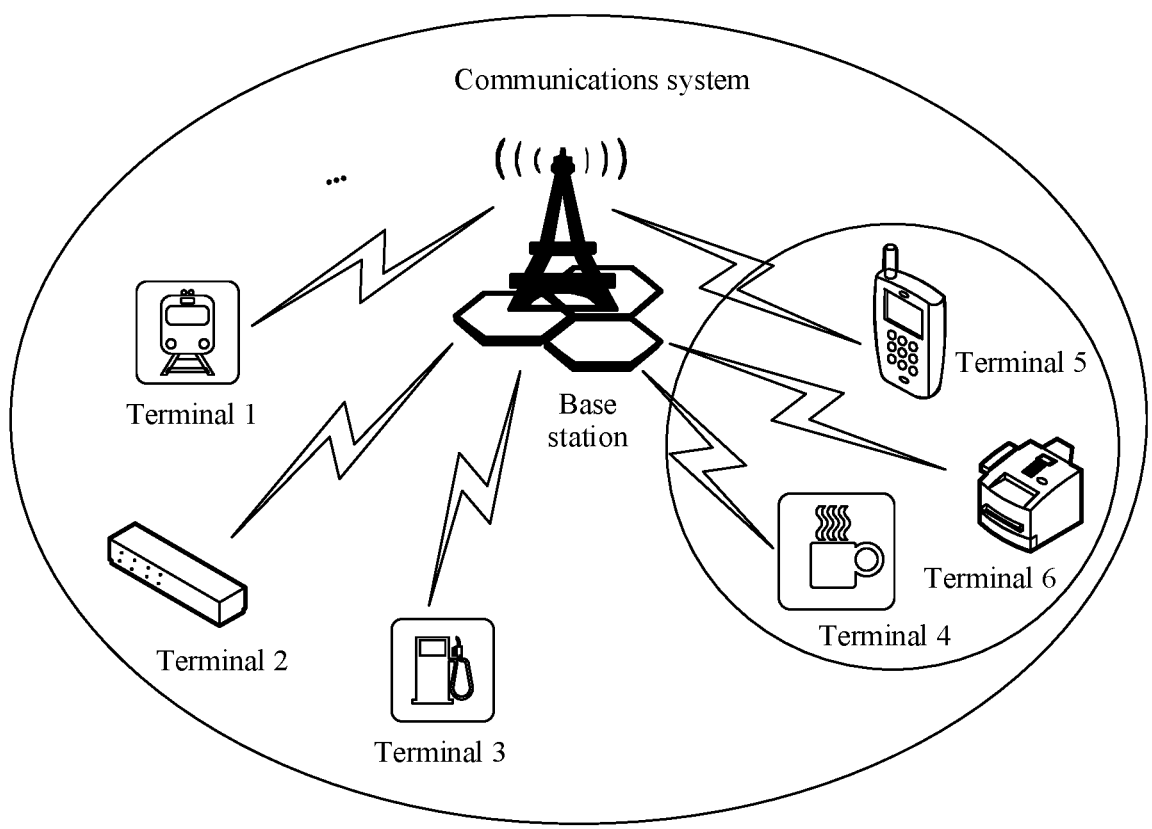
FIG. 1 is a schematic diagram of an architecture of a communications system according to an embodiment of this application.

The terms "first", "second", "third", "A", "B", "C", "D", and the like in the specification and the accompanying drawings in the embodiments of this application are used to distinguish between different objects or to distinguish between different processing on a same object, and are not used to describe a particular order of objects (for example, a size order and a chronological order). In addition, the terms "including", "having", or any other variant thereof in descriptions of this application are intended to cover non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. It should be noted that, in the embodiments of this application, the word "example" or "for example" is used to represent giving an example, an illustration, or a description. Any embodiment or design scheme described as "example" or "for example" in the embodiments of this application should not be explained as being more preferred or having more advantages than another embodiment or design scheme. Exactly, use of "example" or "for example" is intended to present a relative concept in a specific manner. The character "/" may represent an "or" relationship in the embodiments of this application.

In the embodiments of this application, "at least one" may also be described as "one or more", and "a plurality of" may be two, three, four, or more. This is not limited in this application.

First, technical terms described in the embodiments of this application are described.

A bandwidth part (BWP) may also be referred to as a carrier bandwidth part. In frequency domain, one BWP includes a positive integer quantity of contiguous resource elements, for example, a positive integer quantity of contiguous subcarriers, resource blocks (RB), or resource block groups (RBG). One RB includes a positive integer quantity of subcarriers, for example, 12 subcarriers. One RBG includes a positive integer quantity of RBs, for example, four or eight RBs. The BWP may be a downlink BWP or an uplink BWP. The uplink BWP is used by UE to send a signal to a base station, and the downlink BWP is used by the base station to send a signal to the UE. In the embodiments of this application, "a positive integer quantity" may be one, two, three, or more. This is not limited in the embodiments of this application.

In a cell, the base station may configure one or more BWPs for an uplink or a downlink of the UE. For example, a maximum of four BWPs are configured for the uplink and a maximum of four BWPs are configured for the downlink. These BWPs may be referred to as dedicated BWPs of the UE. A quantity of BWPs configured for the uplink may be the same as or different from a quantity of BWPs configured for the downlink. The one or more BWPs configured by the base station for the UE may be referred to as a configured BWP of the UE. For example, the one or more uplink BWPs configured by the base station for the UE may be referred to as a configured uplink BWP of the UE. The one or more downlink BWPs configured by the base station for the UE may be referred to as a configured downlink BWP of the UE. For each BWP, a numerology of the BWP may be independently configured through preconfiguration or signaling sent by the base station to the UE. Numerologies of different BWPs may be the same or different.

In the embodiments of this application, signaling may be semi-static signaling and/or dynamic signaling. The semi-static signaling may be radio resource control (RRC) signaling, a broadcast message, a system message, or a MAC control element (CE). The broadcast message may include remaining minimum system information (RMSI). The dynamic signaling may be physical layer signaling. The physical layer signaling may be signaling carried on a physical control channel or signaling carried on a physical data channel. The physical data channel may be a downlink channel, for example, a physical downlink shared channel (PDSCH). The physical control channel may be a physical downlink control channel (PDCCH), an enhanced physical downlink control channel (EPDCCH), a narrowband physical downlink control channel (NPDCCH), or a machine type communication physical downlink control channel (MPDCCH). Signaling carried on the PDCCH or the EPDCCH may also be referred to as downlink control information (DCI). The physical control channel may alternatively be a physical sidelink control channel, and signaling carried on the physical sidelink control channel may also be referred to as sidelink control information (SCI).

In the uplink and/or the downlink, the base station may activate only one of the configured BWPs of the UE for the UE, and the UE and the base station may send and receive data only on the activated BWP. For example, the UE sends a physical uplink control channel (PUCCH) and/or a physical uplink shared channel (PUSCH) to the base station only on an activated uplink BWP. The base station sends a PDCCH and/or a PDSCH to the UE only on an active downlink BWP.

A default BWP is a BWP configured by a base station for a terminal. In a cell, the base station may configure a BWP inactivity timer for the terminal. If the terminal detects uplink scheduling or downlink grant of the terminal within a running time of the timer, and the uplink scheduling or the downlink grant may be carried by a PDCCH, the bwp-InactivityTimer is started or restarted. If the UE does not detect uplink scheduling or downlink grant within the running time of the timer, an active BWP of the UE in the cell is switched to the default BWP when the bwp-InactivityTimer expires. When the base station does not configure the default BWP for the terminal, an initial downlink BWP may be used as the default BWP. An initial BWP may be a BWP used by the terminal device to receive or send data before the terminal device receives dedicated BWP configuration information, and is generally configured by using a system message. Alternatively, the initial downlink BWP may be a BWP used to receive a system message. Alternatively, the initial BWP may be a BWP used by the terminal to send a physical random access channel (PRACH) to the base station, or the like. The initial BWP may include an initial downlink BWP, an initial uplink BWP, and the like. For ease of description, in the present invention, only BWP switching to a default BWP is used as an example, and BWP switching to an initial BWP is not described again. Switching from an active BWP to a default BWP can avoid inconsistent understanding between the base station and the terminal caused by a loss of DCI of the UE, and improve robustness of BWP switching or data scheduling. The default BWP may be a small-bandwidth BWP or a large-bandwidth BWP. Optionally, when the default BWP is a small-bandwidth BWP, the terminal may work on the default small-bandwidth BWP through switching, to reduce power consumption.

An active BWP may be a BWP used by a terminal device to receive or send data after receiving dedicated BWP configuration information. For example, the dedicated BWP configuration information may be RRC. A maximum of four BWPs can be configured for a terminal in a serving cell (the four BWPs do not include an initial BWP). At any moment, only one BWP can be activated, and the activated BWP may be referred to as an active BWP. For example, a bandwidth of the initial BWP is less than a bandwidth of the active BWP.

Large-bandwidth BWP: In the embodiments of this application, the large-bandwidth BWP may be a non-default BWP, or may be a default BWP. Certainly, there may be another name. The name is not limited in the embodiments of this application. An access network device may flexibly configure BWPs with different bandwidths for a terminal, to adapt to different service requirements and different application scenarios of the terminal. In a scenario in which service traffic of the terminal is relatively heavy, the access network device may configure a large-bandwidth BWP for the terminal, to provide a relatively high data transfer rate for the terminal.

Small-bandwidth BWP: In the embodiments of this application, the small-bandwidth BWP may also be referred to as a power-saving BWP, or the like. The name is not limited in the embodiments of this application. In a scenario in which service traffic of a terminal is relatively light, an access network device may configure a small-bandwidth BWP for the terminal. In this way, workloads of radio frequency processing and baseband processing by the terminal can be reduced, to reduce power consumption of the terminal.

A default BWP described in the embodiments of this application is usually a small-bandwidth BWP, and the default small-bandwidth BWP may both improve robustness of BWP switching of the terminal and reduce power consumption of the terminal.

BWP switching: BWP switching of a terminal means that an active BWP of the terminal changes. Optionally, the change of the active BWP may cause a change in a bandwidth size of a BWP. For example, a BWP of the terminal is switched from a large-bandwidth BWP to a small-bandwidth BWP. Alternatively, the change of the active BWP may cause a change in a numerology of a BWP. Alternatively, the change of the active BWP may cause changes in both a bandwidth size of a BWP and a numerology of a BWP. Meanings of the BWP switching and the BWP change are the same. This is not limited in the embodiments of this application.

BWP fallback: BWP fallback of a terminal means switching a BWP of the terminal to a default BWP. The BWP inactivity timer in the foregoing may also be referred to as a fallback timer.

Optionally, in a BWP switching scenario, manners in which an active BWP or a working BWP of the terminal is switched include but are not limited to the following several manners:

Manner 1: An access network device sends downlink control information (DCI) to the terminal, where the DCI includes but is not limited to a DCI format 0_1 (DCI0_1) and a DCI format 1_1 (DCI1_1). The DCI carries a BWP identifier (ID). If an uplink (UL) or downlink (DL) BWP indicated in the DCI0_1/1_1 is different from a current active UL/DL BWP, the BWP indicated by the DCI is set to the active UL/DL BWP. For example, in a cell, the access network device configures four BWPs for the terminal: a BWP 1 with a BWP ID 1, a BWP 2 with a BWP ID 2, a BWP 3 with a BWP ID 3, and a BWP 4 with a BWP ID 4. The terminal currently works on the active BWP 1. The access network device sends DCI to the terminal, where a BWP ID carried in the DCI is 3. In this case, after receiving the DCI, the terminal may set the BWP 3 indicated by the DCI as an active uplink or downlink BWP.

It should be noted that, when the BWP indicated by the DCI is a default BWP, the DCI may further indicate the terminal to switch to the default BWP.

Manner 2: The base station sends a MAC CE to the terminal, and the terminal receives the MAC CE, and determines, based on the MAC CE, whether to perform BWP switching.

Manner 3: The base station sends RRC signaling to the terminal, and the terminal receives the RRC signaling, and determines, based on the RRC signaling, whether to perform BWP switching.

Certainly, when the BWP indicated by the DCI received by the terminal is a default BWP, the terminal may also perform fallback to the default BWP.

Cell deactivation (also referred to as carrier deactivation): An access network device may configure a plurality of BWPs for each cell. There is an active BWP in a cell in an activated state. In this case, a terminal may perform communication through the active cell or the active BWP in the active cell. On the contrary, there is no active BWP in a cell in a deactivated state.

Figure 7A:
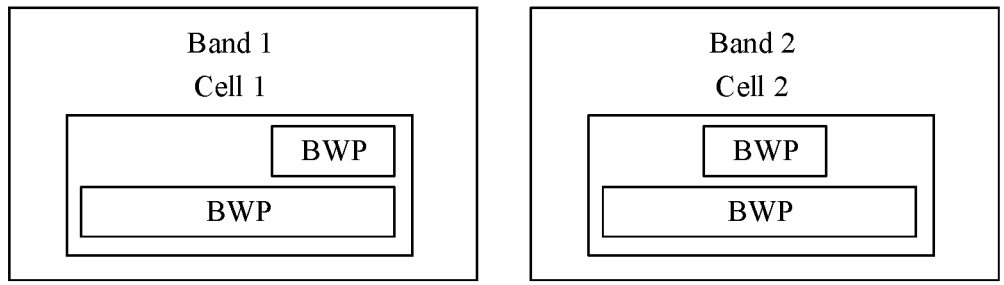
FIG. 7(a), FIG. 7(b), and FIG. 7(c) are schematic diagrams of carrier aggregation.
Figure 7B:
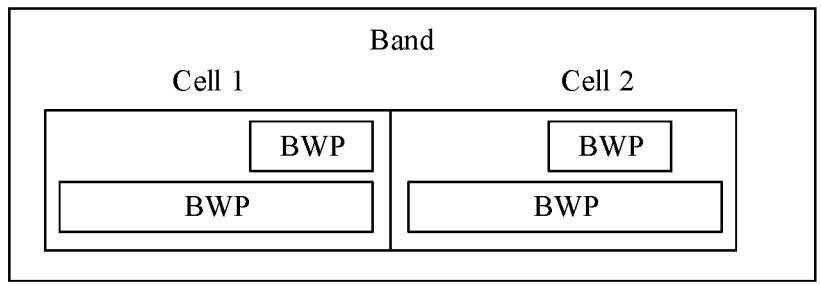
Figure 7C:
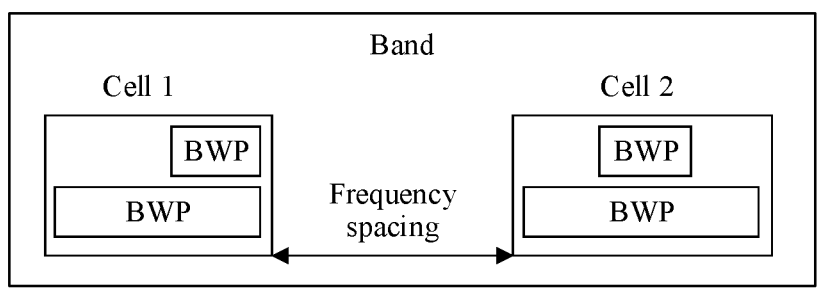

Carrier aggregation: A plurality of spectrums are aggregated for use. Carrier aggregation (CA) may be classified into inter-band carrier aggregation (inter-band CA) and intra-band carrier aggregation (intra-band CA), and the intra-band carrier aggregation may be further classified into intra-band contiguous carrier aggregation and intra-band non-contiguous carrier aggregation. Referring to FIG. 7(*a*) to FIG. 7(*c*), FIG. 7(*a*) shows inter-band CA. In the inter-band CA, a plurality of aggregated carriers (which may also be referred to as cells cell in this specification), that is, a cell 1 and a cell 2, belong to different bands. FIG. 7(*b*) shows intra-band contiguous carrier aggregation. In this carrier aggregation manner, a plurality of aggregated cells, for example, a cell 1 and a cell 2, belong to a same band, and a spectrum of the cell 1 is adjacent to a spectrum of the cell 2. FIG. 7(*c*) shows intra-band non-contiguous carrier aggregation. In this carrier aggregation manner, a plurality of aggregated cells, for example, a cell 1 and a cell 2, belong to a same band, and a spectrum of the cell 1 and a spectrum of the cell 2 are not contiguous. That is, another frequency or band exists between the spectrum of the cell 1 and the spectrum of the cell 2.

In a communications system, to improve a data transfer rate, a carrier aggregation (CA) technology is proposed. A principle of the CA technology is to aggregate two or more component carriers (CC) to support a larger transmission bandwidth. One cell may include one downlink component carrier and one uplink component carrier, or one cell may include one downlink component carrier and two uplink component carriers, or one cell may include only one downlink component carrier. One downlink component carrier corresponds to one cell, and one downlink component carrier may be equivalent to one cell. The communications method provided in the embodiments of this application may be applied to a carrier aggregation scenario. FIG. 1 shows an architecture of a communications system to which the embodiments of this application are applicable. The communications system includes an access network device, and one or more terminals (for example, a terminal 1 to a terminal 6 in FIG. 1) that communicate with the access network device.

The access network device in the embodiments of this application is an apparatus that is deployed in a radio access network to provide a wireless communications function. Optionally, the access network device may be a device that communicates with a wireless terminal over an air interface of an access network through one or more cells. An apparatus for implementing a function of the access network device may be an access network device, or may be an apparatus (for example, a chip in the access network device) that supports the access network device in implementing the function. Optionally, the access network device may perform attribute management on the air interface. The base station device may further coordinate attribute management of the air interface. The access network device includes a macro base station, a micro base station (also referred to as a small cell), a relay device such as a relay station or a chip of a relay device, a transmission reception point (TRP), an evolved NodeB (eNB), a next-generation NodeB (gNB), an ng evolved NodeB (ng-eNB), and the like in various forms. Alternatively, in a distributed base station scenario, the access network device may be a baseband unit (BBU) and a remote radio unit (RRU). In a cloud radio access network (CRAN) scenario, the access network device may be a BBU pool and an RRU.

Optionally, the terminal in the embodiments of this application may be a wireless terminal or a wired terminal, including but not limited to, a vehicle-mounted device, a wearable device, a computing device, a chip built in a computing device, or another processing device connected to a wireless modem. The terminal may further include a cellular phone, a personal communications service (PCS) phone, a cordless phone, a session initiation protocol (SIP) phone, a smartphone, a personal digital assistant (PDA) computer, a tablet computer, a laptop computer, a wireless modem, a handheld device (handheld), and a wireless local loop (WLL) station. The wireless terminal may further be a subscriber unit (SU), a subscriber station (SS), a mobile station (MB), a mobile console (mobile), a remote station (RS), or a remote terminal (RT), a user terminal (UT), a terminal device (UD), user equipment (UE), a wireless data card, a subscriber unit, a machine type communication (MTC) terminal, a terminal device, customer premise equipment (CPE), an access terminal (AT), an access point (AP), a user agent (UA), and the like. In the embodiments of this application, an apparatus for implementing a function of the terminal may be a terminal, or may be an apparatus (for example, a chip in the terminal) that supports the terminal in implementing the function. For ease of description, the devices described above are collectively referred to as a terminal in this application.

It should be noted that the term "communication" in the embodiments of this application may also be described as "data transmission", "information transmission", "transmission", or the like.

The foregoing communications system may be applied to a current long term evolution (LTE) system or a long term evolution-advanced (LTE Advanced, LTE-A) system, or may be applied to a fifth generation network that is currently being developed or another future network. This is not specifically limited in the embodiments of this application. In different networks, the access network device and the terminal each may correspond to different names in the different communications system. A person skilled in the art may understand that the names do not constitute a limitation on the devices. The 5G network may also be referred to as new radio (NR).

Figure 2:
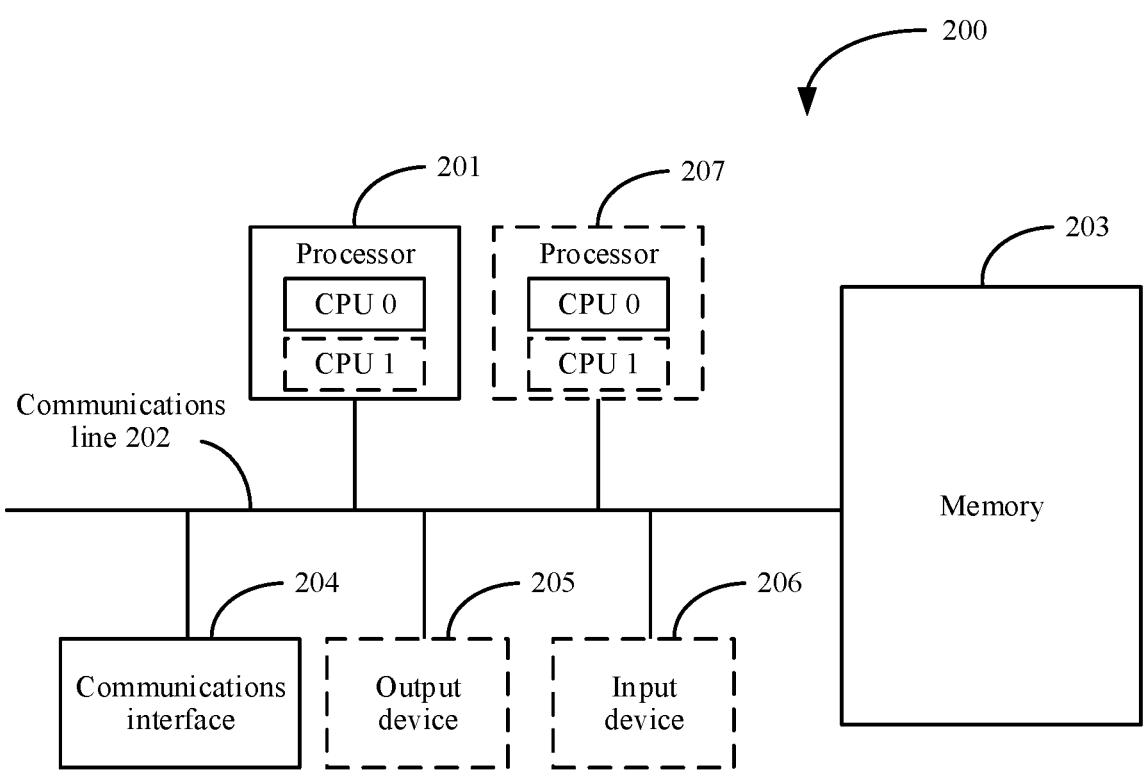
FIG. 2 is a schematic structural diagram of a communications device according to an embodiment of this application.

Optionally, the terminal and the access network device in the embodiments of this application may be implemented by using different devices. For example, the terminal and the access network device in the embodiments of this application may be implemented by using a communications device in FIG. 2. FIG. 2 is a schematic diagram of a hardware structure of a communications device according to an embodiment of this application. The communications device 200 includes at least one processor 201, a communications line 202, a memory 203, and at least one communications interface 204. The memory 203 may be further included in the processor 201.

The processor 201 may be a general-purpose central processing unit (CPU), a microprocessor, an application-specific integrated circuit (ASIC), or one or more integrated circuits that are configured to control execution of a program in a solution of this application.

The communications line 202 may include a path for transmitting information between the foregoing components.

The communications interface 204 is configured to communicate with another device. In the embodiments of this application, the communications interface may be a module, a circuit, a bus, an interface, a transceiver, or another apparatus that can implement a communications function, and is configured to communicate with another device. Optionally, when the communications interface is a transceiver, the transceiver may be an independently disposed transmitter, and the transmitter may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in the embodiments of this application.

The memory 203 may be a read-only memory (ROM) or another type of static storage device that can store static information and instructions, or a random access memory (RAM) or another type of dynamic storage device that can store information and instructions. The memory 203 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray optical disc, and the like), a magnetic disk storage medium or another magnetic storage device, any other medium that can be used to carry or store expected program code in a form of an instruction or a data structure and that can be accessed by a computer, but is not limited thereto. The memory may exist independently, and is connected to the processor through the communications line 202. The memory may alternatively be integrated with the processor.

The memory 203 is configured to store computer-executable instructions for implementing the solutions of this application, and the processor 201 controls the execution.

The processor 201 is configured to execute the computer-executable instructions stored in the memory 203, to implement the communications methods provided in the following embodiments of this application.

Optionally, the computer-executable instructions in the embodiments of this application may also be referred to as application program code, instructions, computer programs, or other names. This is not specifically limited in the embodiments of this application.

During specific implementation, in an embodiment, the processor 201 may include one or more CPUs, for example, a CPU 0 and a CPU 1 in FIG. 2.

During specific implementation, in an embodiment, the communications device 200 may include a plurality of processors, for example, the processor 201 and a processor 207 in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communications device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive an input from a user in a plurality of manners. For example, the input device 206 may be a mouse, a keyboard, a touchscreen device, or a sensing device.

The communications device 200 may be a general-purpose device or a dedicated device. A type of the communications device 200 is not limited in the embodiments of this application. The terminal or the access network device may be a device having a structure similar to that in FIG. 2.

Figure 8:
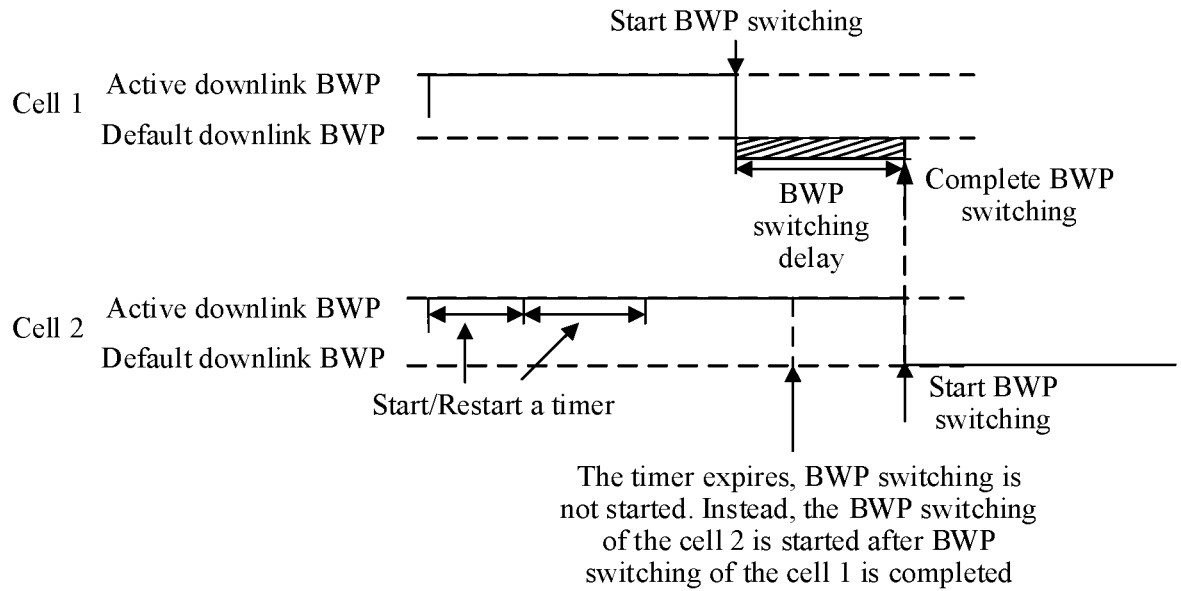
FIG. 8 is a schematic flowchart 1 of BWP switching according to an embodiment of this application.

In a possible implementation, as shown in FIG. 8, during BWP switching of a cell (assuming that the cell is a cell 1), if BWP switching of another cell (assuming that the cell is a cell 2) also needs to be performed, a BWP switching procedure of the cell 2 is started only after the BWP switching of the cell 1 is completed. It can be learned that after a BWP fallback timer (bwp-InactivityTimer) of the cell 2 expires, because switching of the cell 2 from a large-bandwidth BWP to a small-bandwidth BWP is not performed in a timely manner, the terminal continues to work on the large-bandwidth BWP. Workloads of radio frequency processing and baseband processing are relatively large and power consumption is relatively high.

Figure 3:
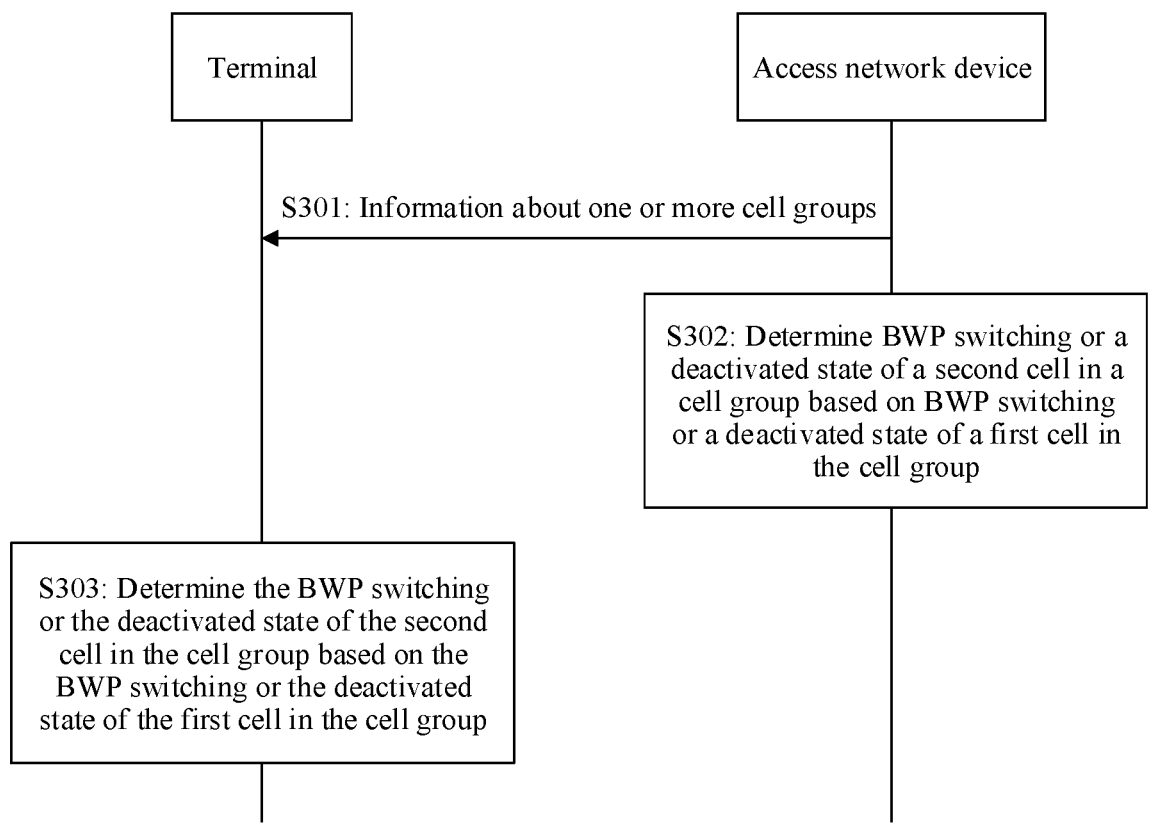
FIG. 3 is a schematic flowchart 1 of a communications method according to an embodiment of this application.

To resolve the foregoing technical problem, an embodiment of this application provides a communications method. As shown in FIG. 3, the method includes the following steps.

S301: An access network device sends information about one or more cell groups to a terminal.

Correspondingly, the terminal receives the information about the one or more cell groups from the access network device.

In a possible implementation, the access network device may configure one or more cell groups. For example, the access network device classifies different cells into different cell groups based on a service type, service traffic, and the like of a cell.

One cell group (which may also be referred to as a carrier group) includes one first cell (which may also be referred to as a first carrier) and at least one second cell (which may also be referred to as a second carrier). For example, a first cell in a cell group may be a primary cell (PCell) (which may also be referred to as a primary carrier), or the first cell may be a secondary cell (which may also be referred to as a secondary carrier). A cell, other than the first cell, that is configured for the terminal in the cell group is a second cell. Optionally, a PCell is not configured as the second cell. In other words, the second cell may be a secondary cell.

Optionally, small-bandwidth BWPs or default BWPs of cells in a cell group constitute or are considered as a BWP set or a BWP bundle. The BWP set may be referred to as a second-type BWP group or a second BWP group. A specific name is not limited. A BWP in the second BWP group is referred to as a second BWP. For example, active BWPs in a plurality of cells may be further grouped into or considered as a first BWP bundle, and a BWP in the first BWP bundle is referred to as a first BWP. When switching from a first BWP of a first cell to a second BWP is performed, switching from a first BWP of a second cell to a second BWP is also performed at the same time. The second BWPs of the first cell and the second cell may be default BWPs in the first cell and the second cell. In a cell, for a terminal, a BWP other than a second BWP in BWPs of the terminal is a first BWP of the terminal.

The following mainly describes the communications method in this embodiment of this application by using an example in which one cell group is configured and the access network device is a base station. For configuration of another cell group and a related communications method, refer to descriptions of configuration of one cell group and the communications method in this embodiment of this application.

S302: The access network device determines BWP switching or a deactivated state of a second cell in a cell group based on BWP switching or a deactivated state of a first cell in the cell group.

In this embodiment of this application, a BWP on the first cell, a BWP in the first cell, or a BWP of the first cell means a BWP of the terminal in the first cell. Similarly, a BWP on the second cell, a BWP in the second cell, or a BWP of the second cell means a BWP of the terminal in the second cell. A general description is provided herein, and details are not described below.

Specifically, the access network device determines the BWP switching of the second cell in the cell group based on the BWP switching of the first cell in the cell group. Alternatively, the access network device determines the deactivated state of the second cell in the cell group based on the deactivated state of the first cell in the cell group. Alternatively, the access network device determines the deactivated state of the second cell in the cell group based on the BWP switching of the first cell in the cell group.

S303: The terminal determines the BWP switching or the deactivated state of the second cell in the cell group based on the BWP switching or the deactivated state of the first cell in the cell group.

It should be noted that a sequence of performing S302 and S303 is not limited in this embodiment of this application. In a possible implementation, S302 and S303 are performed at the same time (for example, in a same subframe, slot, or symbol).

Specifically, the terminal determines the BWP switching of the second cell in the cell group based on the BWP switching of the first cell in the cell group. Alternatively, the terminal determines the deactivated state of the second cell in the cell group based on the deactivated state of the first cell in the cell group. Alternatively, the terminal determines the deactivated state of the second cell in the cell group based on the BWP switching of the first cell in the cell group.

In this embodiment of this application, S302 may include but is not limited to the following several implementations.

Figure 4:
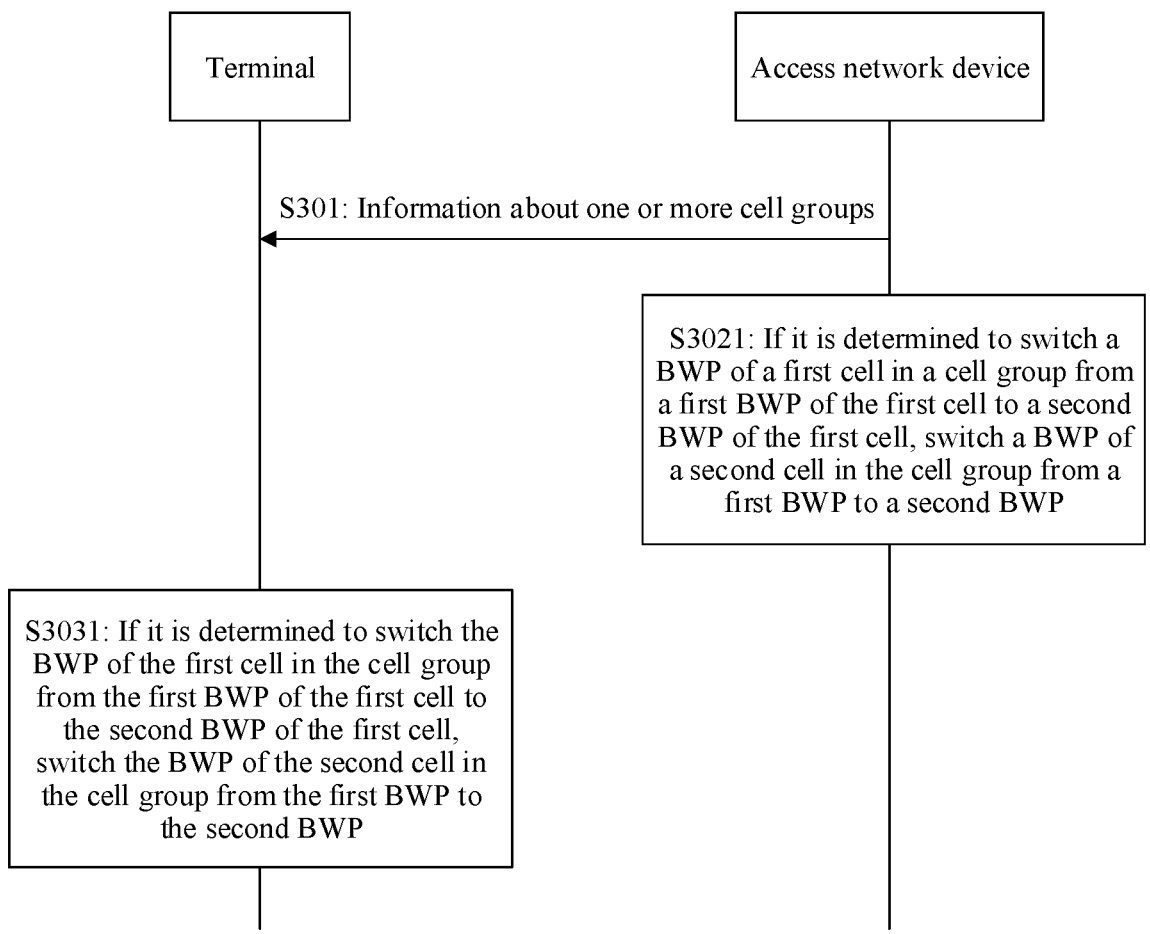
FIG. 4 is a schematic flowchart 2 of a communications method according to an embodiment of this application.

Referring to FIG. 4, in an implementation, the access network device determines the BWP switching of the second cell in the cell group based on the BWP switching of the first cell in the cell group. Specifically, S302 may be implemented as S3021: If the access network device determines to switch a BWP of the first cell in the cell group from a first BWP of the first cell to a second BWP of the first cell, the access network device switches a BWP of the second cell in the cell group from a first BWP of the second cell to a second BWP of the second cell. In this scenario, a working BWP or a current active BWP of the terminal is switched from the first BWP to the second BWP. In this embodiment of this application, a BWP in a cell may also be described as a BWP of the cell, and a general description is provided herein.

Correspondingly, S303 may be implemented as S3031: If the terminal determines to switch the BWP of the first cell in the cell group from the first BWP of the first cell to the second BWP of the first cell, the terminal switches the BWP of the second cell in the cell group from the first BWP to the second BWP.

Optionally, S3031 and S3021 may be performed at the same time (for example, in a same subframe, slot, or symbol).

The first BWP is a large-bandwidth BWP or a non-default BWP, and the second BWP is a small-bandwidth BWP or a default BWP. Alternatively, the first BWP is a small-bandwidth BWP or a default BWP, and the second BWP is a large-bandwidth BWP or a non-default BWP.

Figure 12:
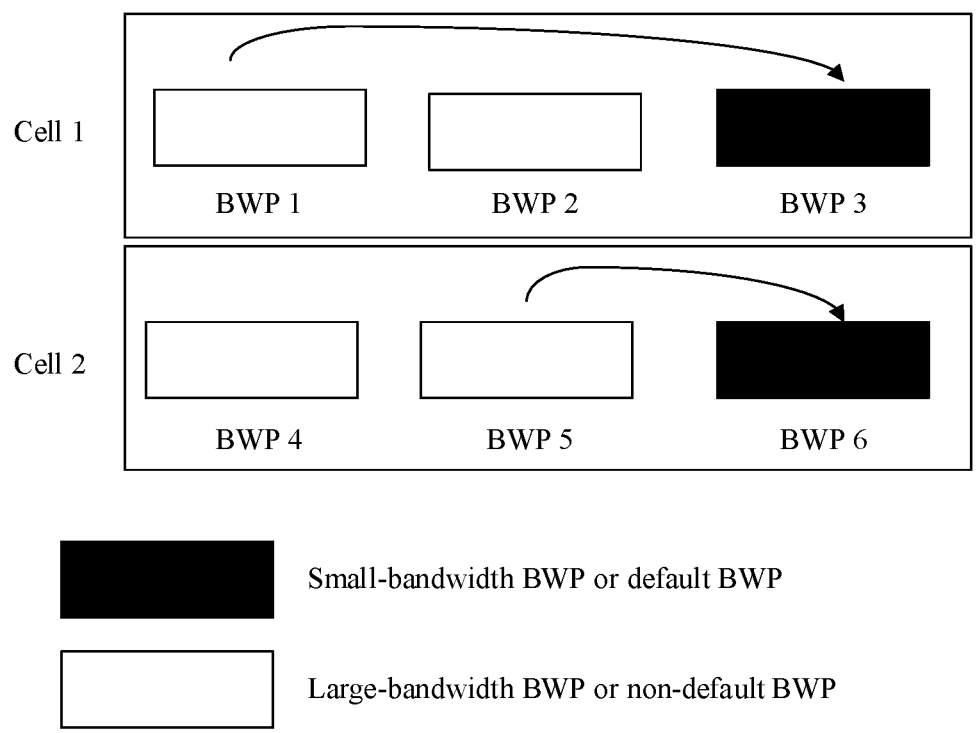
FIG. 12 is a schematic flowchart 3 of BWP switching according to an embodiment of this application.

If the first BWP is a large-bandwidth BWP, and the second BWP is a small-bandwidth BWP, S3021 may be implemented as: When the access network device determines that the BWP of the first cell needs to be switched from a large-bandwidth BWP to a small-bandwidth BWP, the access network device also switches the BWP of the second cell in the cell group from a large-bandwidth BWP to a small-bandwidth BWP. For example, referring to FIG. 12, a cell 1 is the first cell in the cell group, and a cell 2 is the second cell in the cell group. If the access network device determines to switch a BWP of the cell 1 to a small-bandwidth BWP 3 of the cell 1, correspondingly, the access network device switches a BWP of the cell 2 to a small-bandwidth BWP 6 of the cell 2.

Correspondingly, if the terminal determines that the BWP of the first cell needs to be switched from the large-bandwidth BWP to the small-bandwidth BWP, the terminal also switches the BWP of the second cell in the cell group from the large-bandwidth BWP to the small-bandwidth BWP.

The access network device or the terminal switches the BWP of the first cell from the first BWP of the first cell to the second BWP of the first cell in at least one of the following manners. The first BWP may be a large-bandwidth BWP, and the second BWP may be a small-bandwidth BWP, for example, a default BWP. For example, alternatively, the first BWP may be a small-bandwidth BWP, and the second BWP is a large-bandwidth BWP. Alternatively, for example, the first BWP and the second BWP are different in at least one of a bandwidth or a sending or receiving parameter (for example, numerology). This is not limited herein.

The numerology is a parameter used in a communications system. The communications system (for example, 5G) may support a plurality of types of numerologies. The numerology may be defined by using one or more of the following parameter information: a subcarrier spacing, a cyclic prefix (CP), a time unit, a bandwidth, and the like. For example, the numerology may be defined by using the subcarrier spacing and the CP.

The subcarrier spacing may be an integer greater than or equal to 0, for example, may be 15 kHz (kilohertz), 30 kHz, 60 kHz, 120 kHz, 240 kHz, or 480 kHz. A different subcarrier spacing may be an integer multiple of 2, and certainly, may also be designed as another value.

CP information may include a CP length and/or a CP type. For example, the CP may be a normal CP (NCP) or an extended CP (ECP).

The time unit is used to represent a time unit in time domain, for example, may be a sampling point, a symbol, a mini-slot, a slot, a subframe, or a radio frame. Information about the time unit may include a type, a length, a structure, or the like of the time unit.

The bandwidth may be a segment of contiguous resources in frequency domain. The bandwidth may sometimes be referred to as a bandwidth part (BWP), a carrier bandwidth part, a subband bandwidth, a narrowband bandwidth, or another name. The name is not limited in this application. For example, one BWP includes K (K is a positive integer) contiguous subcarriers; or one BWP is a frequency domain resource including N non-overlapping contiguous resource blocks (RB), where a subcarrier spacing of the RB may be 15 kHz, 30 kHz, 60 kHz, 120 kHz, 240 kHz, 480 kHz, or another value; or one BWP is a frequency domain resource including M non-overlapping contiguous resource block groups (RBG), where one RBG includes P contiguous RBs, and a subcarrier spacing of the RB may be 15 kHz, 30 kHz, 60 kHz, 120 kHz, 240 kHz, 480 kHz, or another value, for example, an integer multiple of 2. P is a positive integer.

Manner 1: When a BWP fallback timer of the first cell in the cell group expires, the terminal determines that the BWP of the first cell needs to be switched from the large-bandwidth BWP to the small-bandwidth BWP.

Manner 2: The base station sends DCI to the terminal, and the terminal receives the DCI on the large-bandwidth BWP of the first cell. If a BWP ID carried in the DCI is an ID of the small-bandwidth BWP, the terminal determines that the BWP of the first cell needs to be switched from the large-bandwidth BWP to the small-bandwidth BWP.

Certainly, the terminal or the base station may alternatively determine, in another manner, whether the BWP of the first cell needs to be switched from the large-bandwidth BWP to the small-bandwidth BWP. For example, the base station indicates, by using RRC signaling or a MAC CE, the terminal whether the BWP of the first cell needs to be switched from the large-bandwidth BWP to the small-bandwidth BWP. This is not limited in this embodiment of this application.

Figure 9:
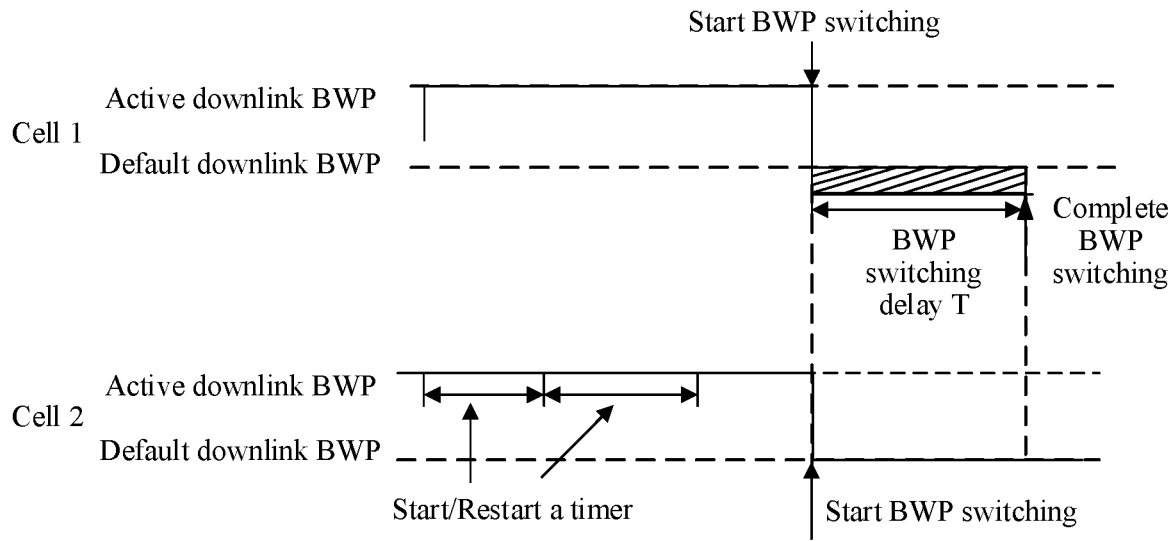
FIG. 9 is a schematic flowchart 2 of BWP switching according to an embodiment of this application.

An example in which the BWP of the first cell is switched to the small-bandwidth BWP through setting a BWP fallback timer is used. Referring to FIG. 9, after the BWP fallback timer expires, the terminal detects no DCI scheduling in the first cell (for example, a cell 1). In this case, the terminal switches the BWP of the first cell (the cell 1) to the small-bandwidth BWP, and at the same time, the terminal also switches the BWP of the second cell (for example, a cell 2) in the cell group from a non-default BWP to a default BWP. In this case, the BWP fallback timer of the cell can be stopped. In this way, the terminal and the base station may communicate with each other through the small-bandwidth BWP of the first cell. It can be learned that, compared with the solution in FIG. 8, in this solution, the terminal may start a BWP switching procedure of the second cell a time T early, so that a time in which the terminal works on the small-bandwidth BWP of the second cell is increased, and power consumption of the terminal can be reduced.

For example, the BWP switching is performed by using the DCI. When the terminal receives the DCI from the base station, and the DCI indicates to switch the BWP of the cell 1 to the small-bandwidth BWP, the terminal switches the BWP of the cell 1 to the small-bandwidth BWP, and at the same time, the terminal also switches the BWP of the second cell (for example, the cell 2) in the cell group from a non-default BWP to a default BWP.

For example, the BWP switching is performed by using the MAC CE. When the terminal receives the MAC CE from the base station, and the MAC CE indicates to switch the BWP of the cell 1 to the small-bandwidth BWP, the terminal switches the BWP of the cell 1 to the small-bandwidth BWP, and at the same time, the terminal also switches the BWP of the second cell (for example, the cell 2) in the cell group from a non-default BWP to a default BWP.

For example, the BWP switching is performed by using the RRC signaling. When the terminal receives the RRC signaling from the base station, and the RRC signaling indicates to switch the BWP of the cell 1 to the small-bandwidth BWP, the terminal switches the BWP of the cell 1 to the small-bandwidth BWP, and at the same time, the terminal also switches the BWP of the second cell (for example, the cell 2) in the cell group from a non-default BWP to a default BWP.

In this way, as the BWP of the first cell in the cell group is switched from the large-bandwidth BWP to the small-bandwidth BWP, the BWP of the second cell in the same cell group is also switched from the large-bandwidth BWP to the small-bandwidth BWP. Generally, switching the BWP of the first cell to the small-bandwidth BWP indicates that service traffic of the terminal is relatively light. In this case, switching the BWP of the second cell in the same cell group to the small-bandwidth BWP can reduce workloads of radio frequency processing and baseband processing by the terminal. Therefore, power consumption of the terminal is reduced.

If the first BWP is a non-default BWP, and the second BWP is a default BWP, S3021 may be implemented as: When the access network device determines that the BWP of the first cell needs to be switched from a non-default BWP to a default BWP, the access network device also switches the BWP of the second cell in the cell group from a non-default BWP to a default BWP. For example, referring to FIG. 12, a cell 1 is the first cell in the cell group, and a cell 2 is the second cell in the cell group. If the access network device determines to switch a BWP of the cell 1 to a default BWP 3 of the cell 1, correspondingly, the access network device switches a BWP of the cell 2 to a default BWP 6 of the cell 2. The access network device only needs to indicate to switch the BWP of the first cell from a current active BWP (a non-default BWP) to a default BWP. This also means that the access network device indicates to switch the BWP of the second cell in the cell group from a current active BWP (a non-default BWP) to a default BWP without additional signaling notification. Indication information sent by the access network device may be referred to as first indication information. The first indication information indicates to perform BWP switching in the first cell. A manner of sending the first indication information includes the DCI, the MAC CE, and the RRC described above. A specific manner to be used is not limited. When receiving the first indication information sent by the access network device, the terminal also switches the BWP of the second cell from a current active BWP (a non-default BWP) to a default BWP without additional signaling sent by the access network device. When a bandwidth of the active BWP of the first cell is greater than a bandwidth of the default BWP, and a bandwidth of the active BWP of the second cell is greater than a bandwidth of the default BWP, this embodiment can advance a BWP switching occasion of the second cell, to save power consumption for the terminal. In addition, signaling overheads of the access network device can also be reduced.

Correspondingly, if the terminal determines that the BWP of the first cell needs to be switched from the non-default BWP to the default BWP, the terminal also switches the BWP of the second cell in the cell group from the non-default BWP to the default BWP.

For a specific implementation in which the terminal or the base station determines whether the BWP of the first cell needs to be switched from the non-default BWP to the default BWP, refer to the foregoing description. For example, the base station indicates, by using RRC signaling, a MAC CE, a BWP fallback timer, or DCI, whether the terminal needs to switch the BWP of the first cell from the non-default BWP to the default BWP. This is not limited in this embodiment of this application.

If the first BWP is a small-bandwidth BWP, and the second BWP is a large-bandwidth BWP, S3021 may be implemented as: When the access network device determines that the BWP of the first cell needs to be switched from a small-bandwidth BWP to a large-bandwidth BWP, the access network device also switches the BWP of the second cell in the cell group from a small-bandwidth BWP to a large-bandwidth BWP.

Correspondingly, when the terminal receives indication information sent by the base station, if the indication information indicates that the terminal needs to switch the BWP of the first cell from the small-bandwidth BWP to the large-bandwidth BWP, the terminal also switches the BWP of the second cell in the cell group from the small-bandwidth BWP to the large-bandwidth BWP.

The base station sends DCI specific to the first cell to the terminal. In this way, after receiving the DCI specific to the first cell from the base station, the terminal may determine, based on a BWP ID in the DCI, whether to switch the BWP of the first cell to the large-bandwidth BWP. Certainly, the terminal or the base station may alternatively determine, in another manner, whether to switch the BWP of the first cell to the large-bandwidth BWP. Details are not described herein again.

Figure 13:
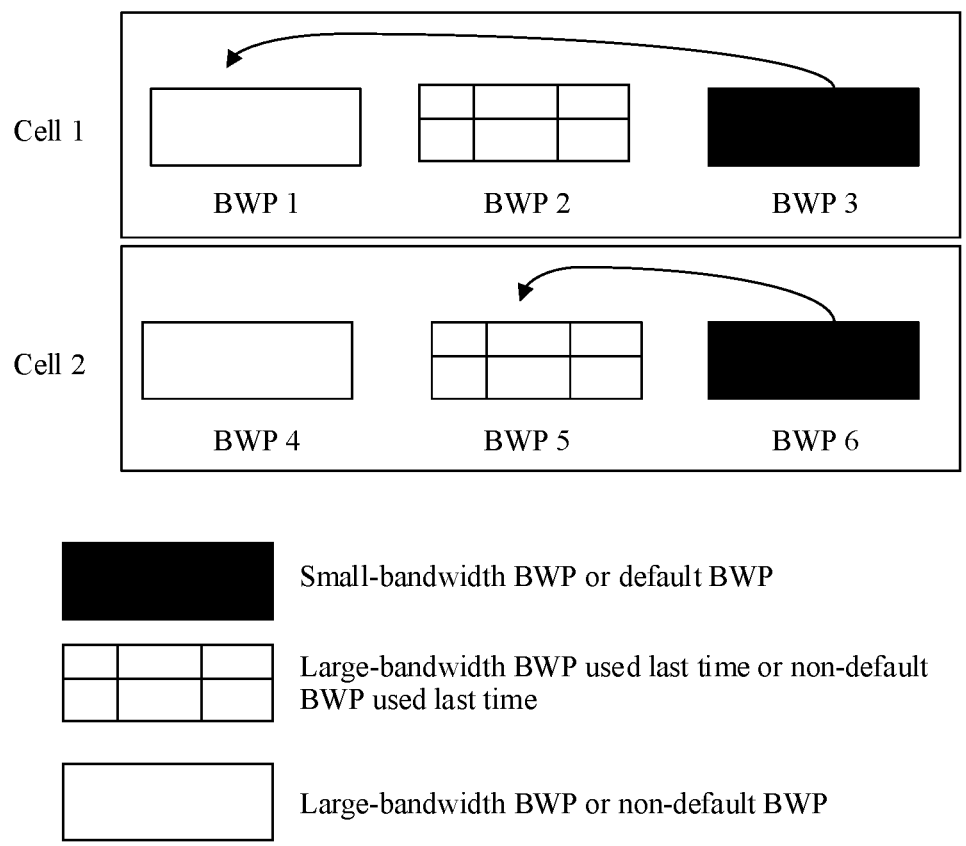
FIG. 13 is a schematic flowchart 4 of BWP switching according to an embodiment of this application.

Optionally, the switching the BWP of the second cell from a small-bandwidth BWP to a large-bandwidth BWP may be implemented as: switching the BWP of the second cell from the small-bandwidth BWP to a preconfigured large-bandwidth BWP. The preconfigured large-bandwidth BWP may be preconfigured by the base station for the terminal by using RRC signaling or other signaling, or may be a BWP preconfigured in a protocol, for example, may be a first active BWP configured by the base station for the UE or may be any BWP in dedicated BWPs of the terminal. For example, referring to FIG. 13, the terminal currently works on a small-bandwidth BWP 3 of a cell 1. If a BWP of the cell 1 needs to be switched to a large-bandwidth BWP, the terminal may switch the BWP of the cell 1 from the BWP 3 to a preconfigured large-bandwidth BWP 1. Correspondingly, the base station switches the BWP of the cell 1 from the small-bandwidth BWP 3 to the preconfigured large-bandwidth BWP 1. In this way, the base station and the terminal can communicate with each other through the BWP 1 of the cell 1.

Optionally, the switching the BWP of the second cell from a small-bandwidth BWP to a large-bandwidth BWP may be implemented as: switching the BWP of the second cell from the small-bandwidth BWP to a large-bandwidth BWP used last time. For example, referring to FIG. 13, the terminal currently works on a small-bandwidth BWP 6 of a cell 2, and before that, the terminal works on a large-bandwidth BWP 5 of the cell 2. If a BWP of the cell 2 needs to be switched to a large-bandwidth BWP, the terminal may switch the BWP of the cell 2 from the small-bandwidth BWP 6 to the large-bandwidth BWP 5 used last time. Correspondingly, the base station switches the BWP of the cell 2 from the small-bandwidth BWP 6 to the large-bandwidth BWP 5 used in last communication with the terminal.

Optionally, the switching the BWP of the second cell from a small-bandwidth BWP to a large-bandwidth BWP may be further implemented as: The access network device sends a first switching indication specific to the second cell in the cell group to the terminal, where the first switching indication carries a target large-bandwidth BWP. In this case, the terminal receives the first switching indication from the second cell in the cell group, and switches the BWP of the second cell from the small-bandwidth BWP to the target large-bandwidth BWP based on the first switching indication. Correspondingly, the base station also switches the BWP of the second cell from the small-bandwidth BWP to the large-bandwidth BWP. For example, the first switching indication may be DCI, and the DCI carries an identifier of a BWP to which the BWP needs to be switched, that is, a BWP ID of the target large-bandwidth BWP. In this way, the second cell in the cell group can flexibly indicate the target large-bandwidth BWP to which the terminal needs to switch the BWP of the second cell, so that the terminal can flexibly switch the BWP of the second cell to the required large-bandwidth BWP for communication.

In this way, as the BWP of the first cell in the cell group is switched from the small-bandwidth BWP to the large-bandwidth BWP, the BWP of the second cell in the same cell group is also switched from the small-bandwidth BWP to the large-bandwidth BWP. Generally, switching the BWP of the first cell to the large-bandwidth BWP indicates that service traffic of the terminal is relatively heavy. In this case, the BWP of the second cell in the same cell group is also switched to the large-bandwidth BWP, so that available bandwidth resources of the terminal can be increased, and data transmission performance of the terminal can be improved.

If the first BWP is a default BWP, and the second BWP is a non-default BWP, S3021 may be implemented as: When the access network device determines that the BWP of the first cell needs to be switched from a default BWP to a non-default BWP, the access network device also switches the BWP of the second cell in the cell group from a default BWP to a non-default BWP.

Correspondingly, if the terminal determines that the BWP of the first cell needs to be switched from the default BWP to the non-default BWP, the terminal also switches the BWP of the second cell in the cell group from the default BWP to the non-default BWP.

The base station sends, to the terminal, downlink grant DCI, specific to the first cell, transmitted on a physical downlink shared channel (PDSCH) or uplink scheduling DCI, specific to the first cell, transmitted on a physical uplink shared channel (PUSCH). In this way, after receiving the DCI specific to the first cell from the base station, the terminal may determine, based on a BWP ID in the DCI, whether to switch the BWP of the first cell to the non-default BWP. Certainly, the terminal or the base station may alternatively determine, in another manner, whether to switch the BWP of the first cell to the non-default BWP. Details are not described herein.

Optionally, the switching the BWP of the second cell from the default BWP to the non-default BWP may be implemented as: switching the BWP of the second cell from the default BWP to a preconfigured non-default BWP. The preconfigured non-default BWP may be preconfigured by the base station for the terminal by using RRC signaling or other signaling, or may be a BWP preconfigured in a protocol, for example, may be a first active BWP configured by the base station for the UE or may be any BWP in dedicated BWPs of the terminal. For example, referring to FIG. 13, the terminal currently works on a default BWP 3 of a cell 1. If a BWP of the cell 1 needs to be switched to a non-default BWP, the terminal may switch the BWP of the cell 1 from the BWP 3 to a preconfigured non-default BWP 1. Correspondingly, the base station switches the BWP of the cell 1 from the default BWP 3 to the preconfigured non-default BWP 1. In this way, the base station and the terminal can communicate with each other through the non-default BWP 1.

Optionally, the switching the BWP of the second cell from the default BWP to the non-default BWP may be implemented as: switching the BWP of the second cell from the default BWP to a non-default BWP used last time. For example, referring to FIG. 13, the terminal currently works on a default BWP 6, and before that, the terminal works on a non-default BWP 5. If a BWP of the terminal in a cell 2 needs to be switched to a non-default BWP, the terminal may switch the BWP of the terminal in the cell 2 from the default BWP 6 to the non-default BWP 5 used last time. Correspondingly, the base station switches the BWP of the terminal in the cell 2 from the default BWP 6 to the non-default BWP 5 used in last communication with the terminal.

Optionally, the switching the BWP of the terminal in the second cell from a default BWP to a non-default BWP may be further implemented as: The access network device sends a first switching indication specific to the second cell in the cell group to the terminal, where the first switching indication carries a target non-default BWP. In this case, the terminal receives the first switching indication from the second cell in the cell group, and switches the BWP of the second cell from the default BWP to the target non-default BWP based on the first switching indication. Correspondingly, the base station also switches the BWP of the second cell from the default BWP to the target non-default BWP of the terminal in the second cell. For example, the first switching indication may be DCI, and the DCI carries an identifier of a BWP to which the BWP needs to be switched, that is, a BWP ID of the target non-default BWP. In this way, the second cell in the cell group can flexibly indicate the target non-default BWP to which the terminal needs to switch the BWP of the second cell, so that the terminal can flexibly switch the BWP of the second cell to the required non-default BWP for communication.

In this way, as the BWP of the first cell in the cell group is switched from the default BWP to the non-default BWP, the BWP of the second cell in the same cell group is also switched from the default BWP to the non-default BWP.

Figure 5:
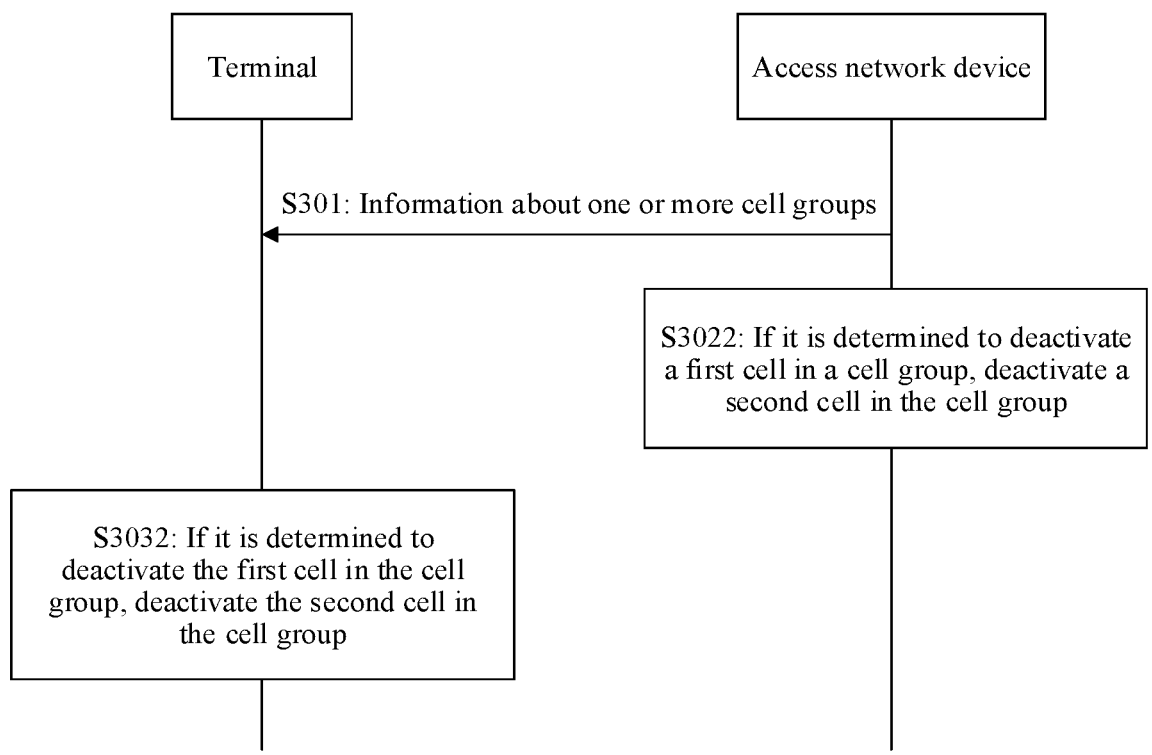
FIG. 5 is a schematic flowchart 3 of a communications method according to an embodiment of this application.

Referring to FIG. 5, in another possible implementation, the access network device determines the deactivated state of the second cell in the cell group based on the deactivated state of the first cell in the cell group. Specifically, S302 may be further implemented as S3022: If the access network device determines to deactivate the first cell in the cell group, the access network device deactivates the second cell in the cell group.

Correspondingly, S303 may be implemented as S3032: If the terminal determines to deactivate the first cell in the cell group, the terminal deactivates the second cell in the cell group.

Optionally, S3032 and S3022 may be performed at the same time (for example, in a same subframe, slot, or symbol).

Optionally, the access network device sends a first indication message to the terminal. Correspondingly, the terminal receives the first indication message from the access network device, where the indication message is used to enable deactivating the second cell in the cell group when the first cell in the cell group is deactivated.

Optionally, the access network device may send a deactivation indication to the terminal, to indicate whether to deactivate the first cell. The deactivation indication includes but is not limited to a medium access control element (MAC CE), radio resource control (RRC), and DCI. Specifically, the terminal or the access network device may determine, in at least one of the following manners, whether to deactivate the first cell:

Manner 1: The access network device configures a deactivation timer (scell deactivation timer) for the terminal. In this way, when a deactivation timer of the first cell in the cell group expires, that is, within a running time of the deactivation timer, if the UE cannot detect uplink scheduling DCI or downlink grant DCI specific to the first cell, the terminal determines that the first cell needs to be deactivated. Optionally, the terminal sends a first deactivation message to the access network device, so that the access network device learns that the first cell needs to be deactivated.

Manner 2: The base station sends DCI specific to the first cell to the terminal, and the terminal receives the DCI specific to the first cell, and determines, based on the DCI, that the first cell needs to be deactivated.

Manner 3: The base station sends a MAC CE specific to the first cell to the terminal, and the terminal receives the MAC CE specific to the first cell, and determines, based on the MAC CE, that the first cell needs to be deactivated.

Manner 4: The base station sends RRC signaling specific to the first cell to the terminal, and the terminal receives the RRC signaling specific to the first cell, and determines, based on the RRC signaling, that the first cell needs to be deactivated.

After the terminal receives the deactivation indication of the first cell in the cell group from the access network device or the deactivation timer of the first cell expires, the terminal deactivates the first cell and the second cell in the cell group.

Optionally, if the access network device determines to deactivate the first cell in the cell group, the access network device deactivates the second cell in the cell group. Specifically, after sending the deactivation indication specific to the first cell in the cell group to the terminal, the access network device sends a deactivation indication specific to the second cell in the cell group to the terminal, to notify the terminal that the second cell in the cell group needs to be deactivated.

Correspondingly, if the terminal determines to deactivate the first cell in the cell group, the terminal determines to deactivate the second cell in the cell group. Specifically, after receiving the deactivation indication specific to the first cell in the cell group from the access network device, the terminal receives the deactivation indication specific to the second cell in the cell group from the access network device, to determine that the second cell in the cell group needs to be deactivated.

Optionally, after receiving the deactivation indication of the first cell, the terminal may alternatively stop sending channel state information (CSI) specific to the first cell and/or CSI specific to the second cell. In this embodiment of this application, that the terminal receives the deactivation indication from the access network device may mean that the terminal receives the deactivation indication from the access network device and successfully parses the deactivation indication.

There are four cases of an occasion for stopping sending the CSI:

Case 1: Corresponding to the manner 1, the deactivation indication is that the deactivation timer expires. In a slot in which the deactivation timer expires, the terminal stops sending the CSI specific to the first cell and/or the CSI specific to the second cell.

Case 2: Corresponding to the manner 2, the deactivation indication is DCI. Because the DCI does not need to be carried by a PDSCH, after receiving the DCI, the terminal does not need to perform PDSCH processing. In addition, the DCI generally does not need to be processed by a layer 2 (RLC layer) or a layer 3 (RRC layer). Therefore, it may be considered that after receiving the DCI, the terminal can parse the DCI in a relatively short time. Correspondingly, the access network device sends the DCI to the terminal, and the terminal stops sending the CSI in a slot in which the terminal receives the DCI from the access network device.

Case 3: Corresponding to the manner 3, the deactivation indication is a MAC CE. In a slot in which the terminal receives the MAC CE from the access network device, namely, a slot in which the terminal successfully parses the MAC CE, the terminal stops sending the CSI. For example, the slot in which the terminal successfully parses the MAC CE and a slot in which the terminal stops sending the CSI meet the following relationship:

$$n1 = n + \left\lceil \frac{N}{14} + \frac{0.5}{T_{sf}} \right\rceil \quad (1)$$

Figure 10:
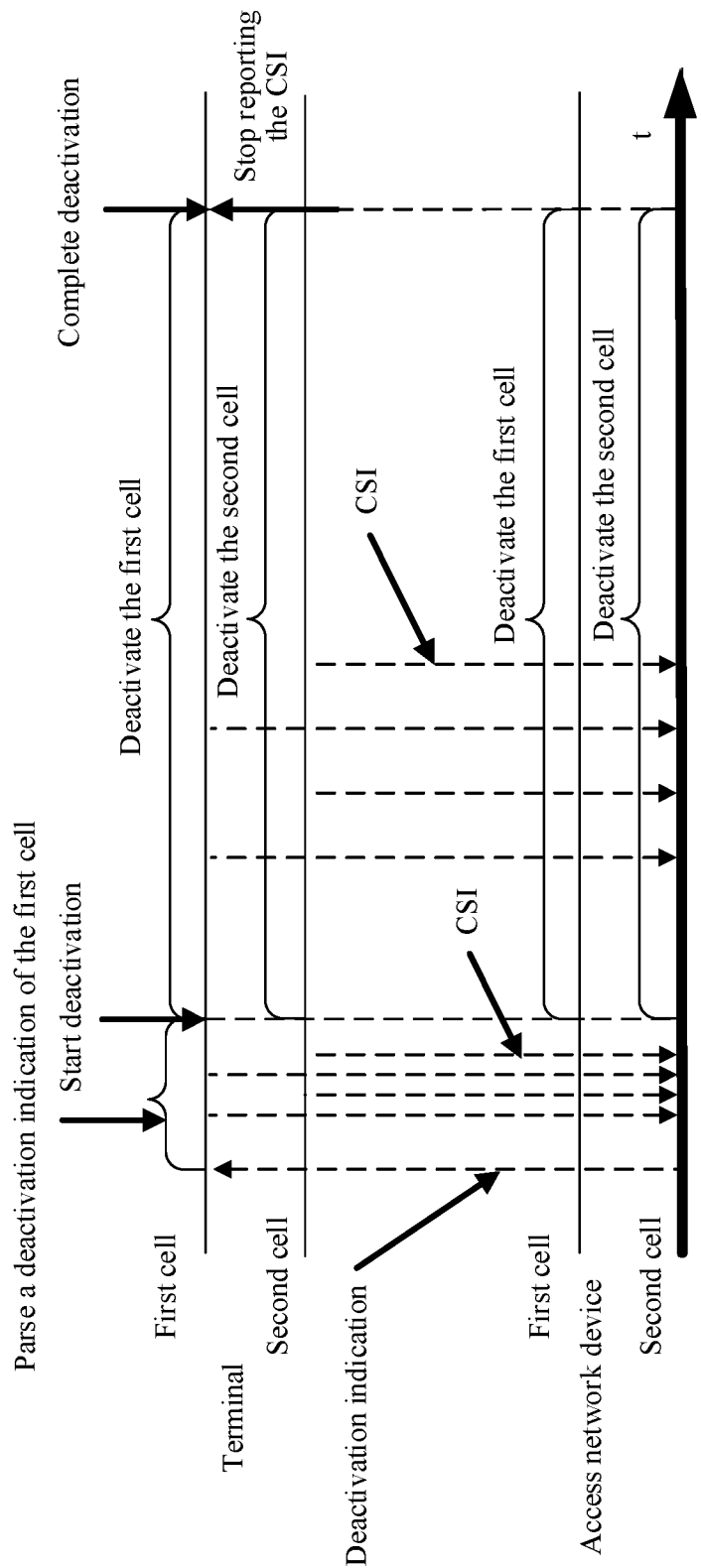
FIG. 10 is a schematic flowchart 1 of deactivating according to an embodiment of this application.
Figure 11:
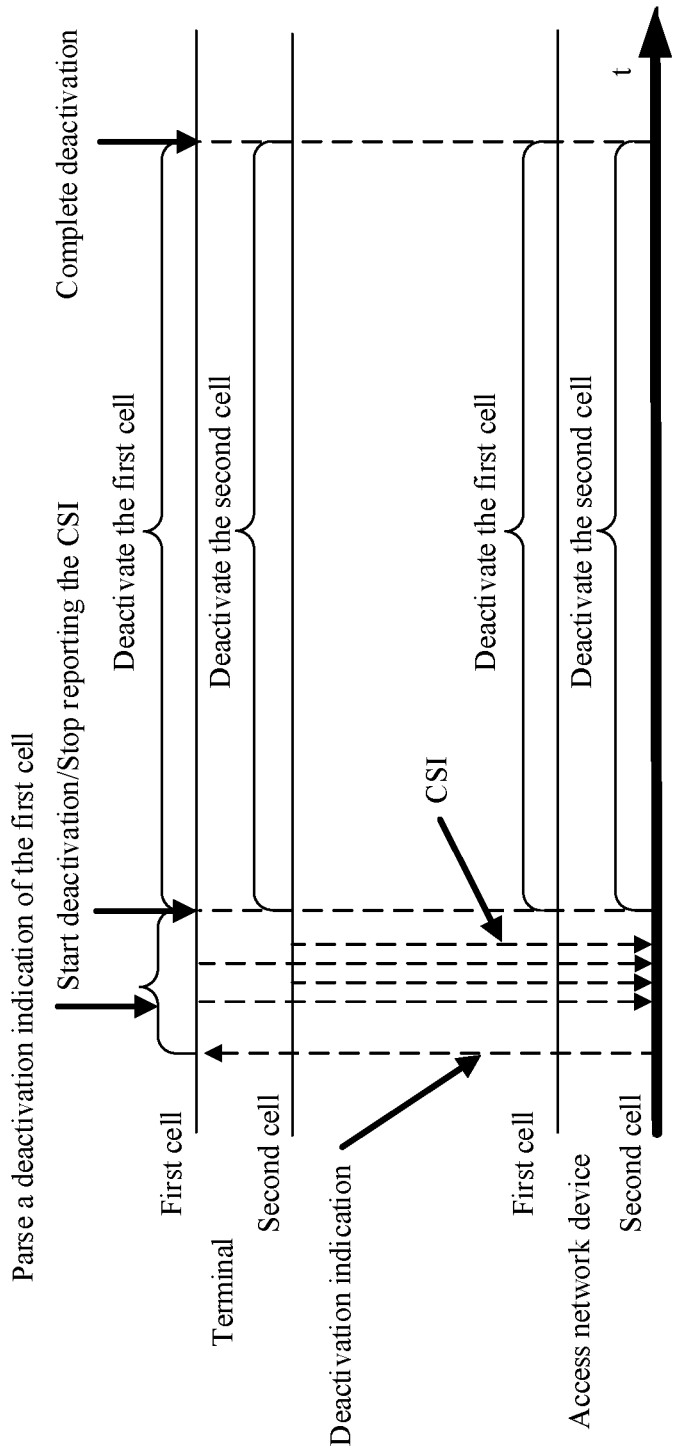
FIG. 11 is a schematic flowchart 2 of deactivating according to an embodiment of this application.

In the foregoing formula, n1 is the slot in which the terminal stops sending the CSI; n is a slot in which the access network device sends the MAC CE; N is a PDSCH processing time, and a unit of the processing time is an orthogonal frequency division multiplexing (OFDM) symbol; 14 is a quantity of OFDM symbols included in 1 slot; $T_{sf}$ is an absolute time length of a subframe in a cell (or a carrier) in which the MAC CE is located; 0.5 is a layer 2 processing time of the MAC CE, and a unit of the processing time is ms; and ⌈ ⌉ is a round-up symbol. Referring to FIG. 11, the access network device sends the deactivation indication (namely, the MAC CE) to the terminal, and the terminal receives and parses the MAC CE. In this process, the terminal may separately report CSI to the access network device through the first cell and the second cell. When the MAC CE is successfully parsed, the terminal stops reporting the CSI. Optionally, the slot in which the terminal stops reporting the CSI and a slot in which deactivation of the first cell is started are a same slot. Optionally, the slot in which the terminal stops reporting the CSI and a slot in which deactivation of the second cell is started are a same slot. Certainly, due to different processing mechanisms of the terminal, a moment at which deactivation of the first cell is performed may be slightly different from a moment at which deactivation of the second cell is performed. This is not limited in this embodiment of this application. It can be learned that, compared with the foregoing method (referring to FIG. 10) in which the terminal stops reporting the CSI only after deactivation is completed, in this embodiment of this application, the terminal can stop reporting the CSI in a timely manner.

Case 4: Corresponding to the manner 4, the deactivation indication is RRC signaling. In a slot in which the terminal receives the RRC signaling from the access network device, namely, a slot in which the terminal successfully parses the RRC signaling, the terminal stops sending the CSI. For example, the slot in which the terminal successfully parses the RRC signaling and a slot in which the terminal stops sending the CSI meet the following relationship:

$$n2 = n + \left\lceil \frac{N}{14} + \frac{t_{layer2,3}}{T_{sf}} \right\rceil \quad (2)$$

In the foregoing formula, n2 is the slot in which the terminal stops sending the CSI; n is a slot in which the access network device sends the RRC signaling; N is a PDSCH processing time, and a unit of the processing time is an orthogonal frequency division multiplexing (OFDM) symbol; 14 is a quantity of OFDM symbols included in 1 slot; $T_{sf}$ is an absolute time length of a subframe in a cell (or a carrier) in which the RRC signaling is located; $t_{layer2,3}$ is a layer 2 and layer 3 processing time of the RRC signaling, and a unit of the processing time is ms; and ⌈ ⌉ is a round-up symbol.

In this way, in the slot in which the terminal receives the deactivation indication, namely, the slot in which the terminal successfully parses the deactivation indication, the terminal may stop reporting the CSI, and does not need to wait for the deactivation to take effect. Compared with the foregoing possible implementation in which the terminal does not immediately deactivate the cell after successfully parsing the deactivation indication, and further stops reporting the CSI only after deactivation takes effect, in this embodiment of this application, because duration of reporting the CSI by the terminal is shortened, power consumption of the terminal is further reduced.

Figure 6:
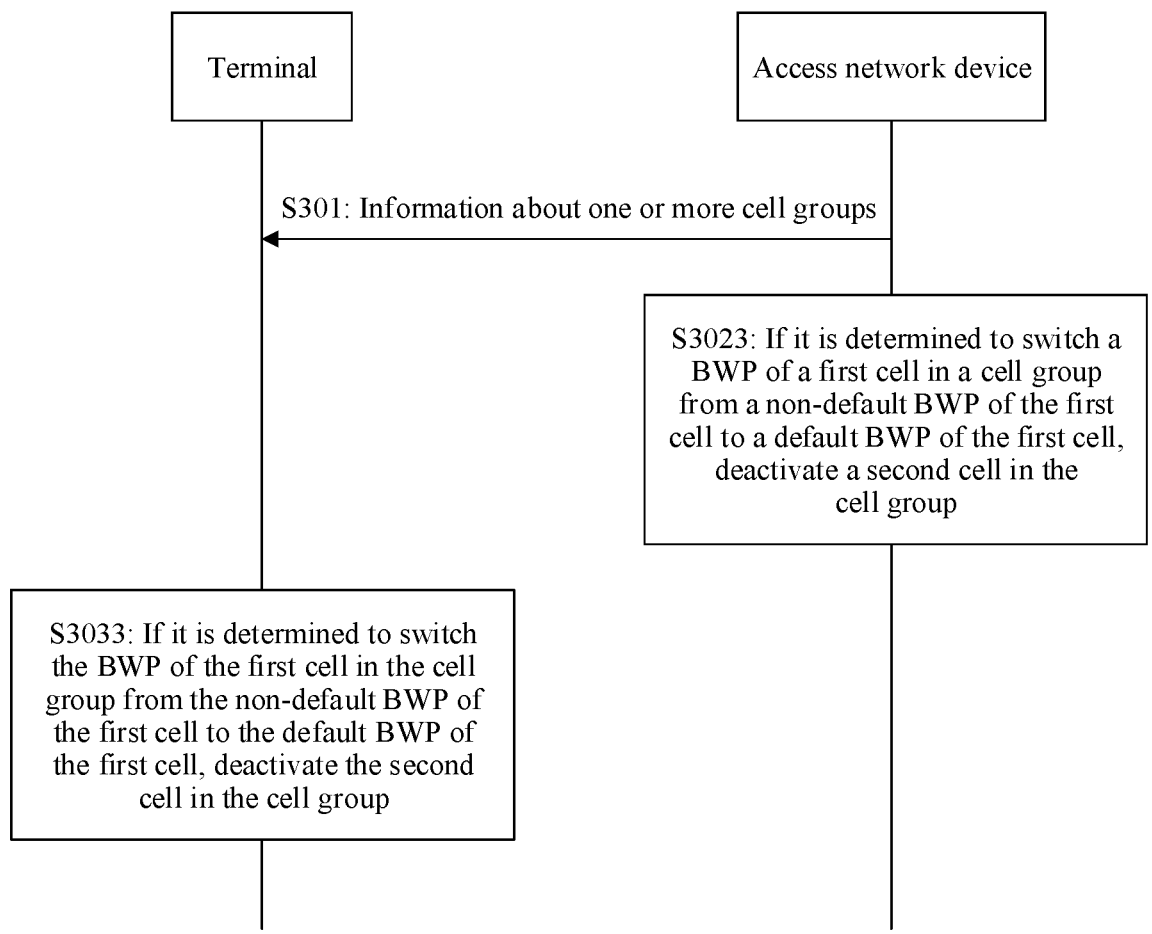
FIG. 6 is a schematic flowchart 4 of a communications method according to an embodiment of this application.

In another possible implementation, the access network device determines the deactivated state of the second cell in the cell group based on the BWP switching of the first cell in the cell group. Specifically, referring to FIG. 6, S302 may be further implemented as S3023: If the access network device determines to switch a BWP of the first cell in the cell group from a non-default BWP of the first cell to a default BWP of the first cell, the access network device deactivates the second cell in the cell group.

Correspondingly, S303 may be implemented as S3033: If the terminal determines to switch the BWP of the first cell in the cell group from the non-default BWP of the first cell to the default BWP of the first cell, the terminal deactivates the second cell in the cell group.

Optionally, S3023 and S3033 may be performed at the same time (for example, in a same subframe, slot, or symbol).

Optionally, the access network device sends a second indication message to the terminal. Correspondingly, the terminal receives the second indication message from the access network device, where the second indication message is used to enable deactivating the second cell in the cell group when the BWP of the first cell in the cell group is switched from the non-default BWP to the default BWP.

For example, the indication message includes a 1-bit indicator, and when the indicator is 0, deactivating the second cell in the cell group when the BWP of the first cell in the cell group is switched from the non-default BWP to the default BWP is not enabled. That is, when the BWP of the first cell in the cell group is switched from the non-default BWP to the default BWP, the second cell in the cell group is not deactivated. When the indicator is 1, deactivating the second cell in the cell group when the BWP of the first cell in the cell group is switched from the non-default BWP to the default BWP is enabled.

For example, the indication message includes a 2-bit indicator. One bit is used to enable deactivating the second cell in the cell group when a BWP fallback timer of the first cell expires, and the other bit is used to enable deactivating the second cell in the cell group when DCI is received through the first cell and the DCI indicates to switch the BWP of the first cell to the default BWP. For example, the indication message includes an indicator 01, where 0 indicates that deactivating the second cell in the cell group when the BWP fallback timer of the first cell expires is not enabled, and 1 indicates that deactivating the second cell in the cell group when DCI is received through the first cell and the DCI indicates to switch the BWP of the first cell to the default BWP is enabled.

For example, when the indicator is used to enable deactivating the second cell in the cell group when the BWP fallback timer of the first cell expires, information configured by the access network device for the terminal is as follows:

---

ServingCellConfig ::= SEQUENCE
{
...
bwp-InactivityTimer      ENUMERATED {ms2, ms3, ms4, ms5, ms6,
ms8, ms10, ms20, ms30, ms40, ms50, ms60, ms80, ms100, ms200,
ms300, ms500, ms750, ms1280, ms1920, ms2560, spare10, spare9,
spare8, spare7, spare6, spare5, spare4, spare3, spare2,
spare1 } OPTIONAL, --Need R
  ...
    sCellDeactivationTimer      ENUMERATED {ms20, ms40, ms80,
ms160, ms200, ms240, ms320, ms400, ms480, ms520, ms640, ms720,
ms840, ms1280, spare2, spare1}
OPTIONAL, -- Cond ServingCellWithoutPUCCH
    SCellDeactivation      ENUMERATED
{BWP-Timer, SCellTimer} OPTIONAL,
-- Need R
  ...
}

---

Certainly, the indication information may further include an indicator with another quantity of bits, used to enable different functions, so as to associate the BWP switching of the first cell in the cell group with the deactivated state of the second cell in the cell group.

Optionally, the access network device may send a BWP switching indication to the terminal, to indicate whether to switch the BWP of the first cell from the non-default BWP to the default BWP. The BWP switching indication includes but is not limited to a MAC CE, RRC signaling, DCI, or that the BWP fallback timer expires. Specifically, for a specific implementation in which the terminal determines, based on the BWP switching indication received from the access network device, whether to switch the BWP of the first cell to the default BWP, refer to the foregoing description. Details are not described herein again.

After receiving the BWP switching indication of the first cell in the cell group from the access network device, the terminal switches the BWP of the first cell from the non-default BWP to the default BWP, and deactivates the second cell in the same cell group. Optionally, after receiving the BWP switching indication of the first cell from the access network device, the terminal may further stop sending CSI specific to the second cell in the cell group.

There are four cases of an occasion on which the terminal stops sending the CSI:

Case 1: When the BWP switching indication is that the BWP fallback timer expires, in a slot in which the BWP fallback timer expires, the terminal stops sending the CSI specific to the second cell in the cell group.

Case 2: When the BWP switching indication is DCI, in a slot in which the terminal receives the DCI from the access network device, the terminal stops sending the CSI specific to the second cell in the cell group.

Case 3: When the BWP switching indication is a MAC CE, in a slot in which the terminal receives the MAC CE from the access network device, namely, a slot in which the terminal successfully parses the MAC CE, the terminal stops sending the CSI specific to the second cell in the cell group. For example, the slot in which the terminal successfully parses the MAC CE and a slot in which the terminal stops sending the CSI may be represented by using the formula (1).

Case 4: When the BWP switching indication is RRC signaling, in a slot in which the terminal receives the RRC signaling from the access network device, namely, a slot in which the terminal successfully parses the RRC signaling, the terminal stops sending the CSI specific to the second cell in the cell group. For example, the slot in which the terminal successfully parses the RRC signaling and a slot in which the terminal stops sending the CSI may be represented by using the formula (2).

In this way, the terminal may stop reporting the CSI in the slot in which the terminal receives the BWP switching indication, namely, the slot in which the terminal successfully parses the BWP switching indication, so that power consumption of the terminal is further reduced.

According to the communications method provided in this embodiment of this application, the terminal receives the information about the one or more cell groups. For one cell group, the terminal determines the BWP switching or the deactivated state of the second cell in the cell group based on the BWP switching or the deactivated state of the first cell in the cell group. In this way, the cell group is configured, and the BWP switching or the deactivated state of the first cell in the cell group is associated with the BWP switching or the deactivated state of the second cell in the cell group, so that BWP switching or deactivating of the second cell is performed based on the BWP switching or the deactivated state of the first cell. This means that when the terminal is in a power saving state in the first cell, the terminal is also in a power saving state in the second cell in the same cell group, so that power consumption of the terminal can be further reduced.

In another possible implementation, if a first timer of the second cell in the cell group expires, and no DCI scheduling exists in the second cell within a time period in which the first timer expires, the access network device deactivates the second cell. Correspondingly, the terminal deactivates the second cell.

The first timer is a timer whose timing duration is shorter in the BWP fallback timer and the deactivation timer. For example, timing duration of the BWP fallback timer is 2 ms, and timing duration of the deactivation timer is 5 ms. After the BWP fallback timer expires, if no DCI scheduling in the second cell is detected, the access network device deactivates the second cell. Correspondingly, the terminal deactivates the second cell.

```
ServingCellConfig ::= SEQUENCE
{
...
   bwp-InactivityTimer     ENUMERATED {ms2, ms3, ms4, ms5,
ms6, ms8, ms10, ms20, ms30, ms40, ms50, ms60, ms80, ms100, ms200,
ms300, ms500, ms750, ms1280, ms1920, ms2560, spare10, spare9,
spare8, spare7, spare6, spare5, spare4, spare3, spare2,
spare1 } OPTIONAL,   --Need R
...
   sCellDeactivationTimer    ENUMERATED {ms20, ms40, ms80,
ms160, ms200, ms240, ms320, ms400, ms480, ms520, ms640, ms720,
ms840, ms1280, spare2, spare1}
OPTIONAL,   -- Cond ServingCellWithoutPUCCH
...
}
```

In another possible implementation, when the first cell in the cell group is a secondary cell, when the second cell in the cell group is deactivated, all cells in the cell group may be deactivated, to further reduce power consumption of the terminal.

In the embodiments of this application, the method provided in the embodiments of this application is described from perspectives of the access network device, the terminal, and interaction between the access network device and the terminal. To implement functions in the foregoing methods provided in the embodiments of this application, the access network device and the terminal device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 14:
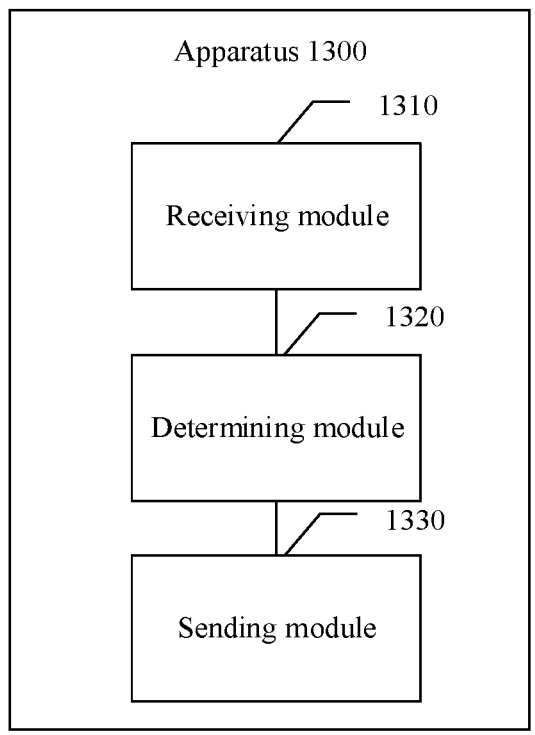
FIG. 14 is a schematic structural diagram 1 of a communications apparatus according to an embodiment of this application.

FIG. 14 is a schematic structural diagram of an apparatus according to an embodiment of this application. The apparatus 1300 may be a terminal, or may be an apparatus that can support a terminal in implementing a function of a terminal device, for example, may be an apparatus in the terminal (for example, a chip system in the terminal). The apparatus 1300 may include a receiving module 1310, a determining module 1320, and a sending module 1330. These modules may perform corresponding functions performed by the terminal in the foregoing embodiments. Details are as follows:

The receiving module 1310 is configured to receive information about one or more cell groups, where one cell group includes one first cell and at least one second cell. The determining module 1320 is configured to: for the cell group, determine carrier bandwidth part BWP switching or a deactivated state of the second cell in the cell group based on BWP switching or a deactivated state of the first cell in the cell group. In this way, the cell group is configured, and the BWP switching or the deactivated state of the first cell in the cell group is associated with the BWP switching or the deactivated state of the second cell in the cell group, so that BWP switching or deactivating of the second cell is performed based on the BWP switching or the deactivated state of the first cell. For example, when the terminal is in a power saving state in the first cell, the terminal is also in a power saving state in the second cell in the same cell group, so that power consumption of the terminal can be further reduced.

In a possible design, that the determining module 1320 is configured to determine carrier bandwidth part BWP switching or a deactivated state of the second cell in the cell group based on BWP switching or a deactivated state of the first cell in the cell group may be specifically: The determining module 1320 is configured to: if it is determined to switch a BWP of the first cell in the cell group from a first BWP of the first cell to a second BWP of the first cell, switch a BWP of the second cell in the cell group from a first BWP of the second cell to a second BWP of the second cell.

The first BWP is a non-default default BWP, and the second BWP is a default BWP. Alternatively, the first BWP is a default BWP, and the second BWP is a non-default BWP.

Optionally, if the first BWP is a non-default BWP, and the second BWP is a default BWP, the determining module 1320 is specifically configured to: if it is determined to switch the BWP of the first cell in the cell group from a non-default BWP of the first cell to a default BWP of the first cell, switch the BWP of the second cell in the cell group from a non-default BWP of the second cell to a default BWP of the second cell.

In this way, as the BWP of the first cell in the cell group falls back from the non-default BWP to the default BWP, the BWP of the second cell in the same cell group also falls back from the non-default BWP to the default BWP. This improves robustness of BWP switching of the terminal. In addition, when the default BWP is a small-bandwidth BWP, as the BWP of the first cell in the cell group is switched from a large-bandwidth BWP to the small-bandwidth BWP, the BWP of the second cell in the same cell group is also switched from a large-bandwidth BWP to a small-bandwidth BWP. Generally, switching the BWP of the first cell to the small-bandwidth BWP indicates that service traffic of the terminal is relatively light. In this case, switching the BWP of the second cell in the same cell group to the small-bandwidth BWP can reduce workloads of radio frequency processing and baseband processing by the terminal. Therefore, power consumption of the terminal is reduced.

Optionally, if the first BWP is a non-default BWP, and the second BWP is a default BWP, the determining module 1320 is specifically configured to: if it is determined to switch the BWP of the first cell in the cell group from a default BWP of the first cell to a non-default BWP of the first cell, switch the BWP of the second cell in the cell group from a default BWP of the second cell to a non-default BWP of the second cell.

In this way, as the BWP of the first cell in the cell group is switched from the default BWP to the non-default BWP, the BWP of the second cell in the same cell group is also switched from the default BWP to the non-default BWP. This can increase available bandwidth resources of the terminal, and improve data transmission performance of the terminal.

In a possible design, the non-default BWP is a preconfigured BWP or a non-default BWP used last time.

Correspondingly, that the determining module 1320 is configured to switch the BWP of the second cell from a default BWP to a non-default BWP may be specifically: The determining module 1320 is configured to switch the BWP of the second cell from the default BWP to the preconfigured non-default BWP. The preconfigured non-default BWP may be preconfigured by a base station for the terminal by using RRC signaling or other signaling. In this way, the base station and the terminal can communicate with each other through the preconfigured non-default BWP.

Alternatively, that the determining module 1320 is configured to switch the BWP of the second cell from a default BWP to a non-default BWP may be: The determining module 1320 is configured to switch the BWP of the second cell from the default BWP to the non-default BWP used last time. For example, referring to FIG. 13, the terminal currently works on a default BWP 6, and before that, the terminal works on a non-default BWP 5. If a BWP of the terminal in a cell 2 needs to be switched to a non-default BWP, the terminal may switch the BWP of the terminal in the cell 2 from the default BWP 6 to the non-default BWP 5 used last time. Correspondingly, the base station switches the BWP of the terminal in the cell 2 from the default BWP 6 to the non-default BWP 5 used in last communication with the terminal.

In a possible design, that the determining module 1320 is configured to switch a BWP of the second cell in the cell group from a first BWP of the second cell to a second BWP of the second cell may be specifically: The determining module 1320 is configured to control the receiving module 1310 to receive a first switching indication of the second cell, where the first switching indication carries a target non-default BWP; and switch the BWP of the second cell from a default BWP of the second cell to the target non-default BWP. In this way, the second cell in the cell group can flexibly indicate the target non-default BWP to which the terminal needs to switch the BWP of the second cell, so that the terminal can flexibly switch the BWP of the second cell to the required non-default BWP for communication.

In a possible design, that the determining module 1320 is configured to determine BWP switching or a deactivated state of the second cell in the cell group based on BWP switching or a deactivated state of the first cell in the cell group may be alternatively: The determining module 1320 is configured to: if it is determined to deactivate the first cell in the cell group, deactivate the second cell in the cell group.

In a possible design, the receiving module 1310 is further configured to receive a first indication message, where the first indication message is used to enable deactivating the second cell in the cell group when the first cell in the cell group is deactivated.

In a possible design, the receiving module 1310 is further configured to receive a deactivation indication specific to the first cell from an access network device, to determine whether the first cell needs to be deactivated.

Optionally, the deactivation indication includes a media access control element MAC CE, radio resource control RRC, or downlink control information DCI.

In a possible design, the sending module 1330 is configured to: after the deactivation indication specific to the first cell in the cell group is received or after a deactivation timer of the first cell expires, stop sending channel state information CSI.

"Receiving" the deactivation indication described in this embodiment of this application may mean receiving and successfully parsing the deactivation indication.

In a possible design, that the determining module 1320 is configured to determine BWP switching or a deactivated state of the second cell in the cell group based on BWP switching or a deactivated state of the first cell in the cell group may be specifically: The determining module 1320 is configured to: if it is determined to switch a BWP of the first cell in the cell group from a non-default BWP of the first cell to a default BWP of the first cell, deactivate the second cell in the cell group.

In a possible design, the receiving module 1310 is further configured to receive a second indication message from an access network device, where the second indication message is used to enable deactivating the second cell in the cell group when the BWP of the first cell in the cell group is switched from the non-default BWP to the default BWP.

In a possible design, the receiving module 1310 is further configured to receive a BWP switching indication from the access network device, where the BWP switching indication is used to indicate to switch the BWP of the first cell from the non-default BWP of the first cell to the default BWP of the first cell.

Optionally, the BWP switching indication includes any one of a MAC CE, RRC, or DCI.

In a possible design, the sending module 1330 is configured to: after the BWP switching indication is received or after a BWP fallback timer of the first cell expires, stop sending CSI of the second cell in the cell group.

"Receiving" the BWP switching indication described in this embodiment of this application may mean receiving and successfully parsing the BWP switching indication.

Figure 15:
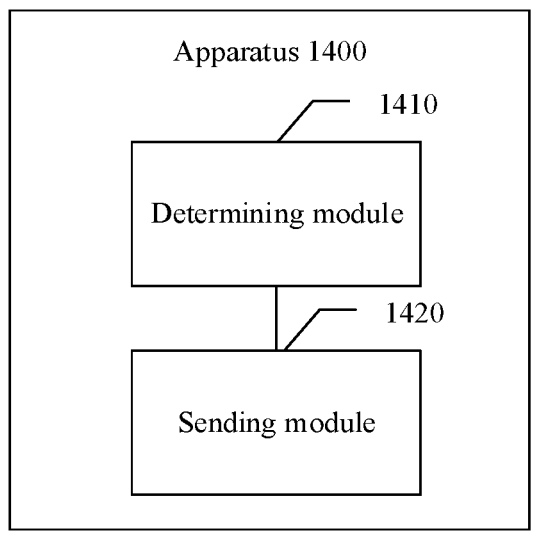
FIG. 15 is a schematic structural diagram 2 of a communications apparatus according to an embodiment of this application.

FIG. 15 is a schematic structural diagram of a communications apparatus according to this application. The apparatus 1400 may be an access network device, and the apparatus can support the access network device in implementing a function of the access network device. For example, the apparatus may be an apparatus in the access network device (for example, a chip system in the access network device). The apparatus 1400 includes a sending module 1420 and a determining module 1410, and the modules may perform corresponding functions performed by the access network device in the embodiments. Details are as follows:

The sending module 1420 is configured to send information about one or more cell groups, where one cell group includes one first cell and at least one second cell. The determining module 1410 is configured to: for the cell group, determine carrier bandwidth part BWP switching or a deactivated state of the second cell in the cell group based on BWP switching or a deactivated state of the first cell in the cell group.

In a possible design, that the determining module 1410 is configured to determine carrier bandwidth part BWP switching or a deactivated state of the second cell in the cell group based on BWP switching or a deactivated state of the first cell in the cell group may be specifically: The determining module 1410 is configured to: if it is determined to switch a BWP of the first cell in the cell group from a first BWP of the first cell to a second BWP of the first cell, switch a BWP of the second cell in the cell group from a first BWP to a second BWP.

In a possible design, the first BWP is a non-default default BWP, and the second BWP is a default BWP.

In a possible design, the first BWP is a default BWP, and the second BWP is a non-default BWP.

In a possible design, the non-default BWP is a preconfigured BWP or a non-default BWP used last time.

Correspondingly, that the determining module 1410 is configured to switch the BWP of the second cell from a default BWP to a non-default BWP may be: The determining module 1410 is configured to switch the BWP of the second cell from the default BWP to the preconfigured non-default BWP. The preconfigured non-default BWP may be preconfigured by a base station for a terminal by using RRC signaling or other signaling. In this way, the base station and the terminal can communicate with each other through the preconfigured non-default BWP.

Alternatively, that the determining module 1410 is configured to switch the BWP of the second cell from a default BWP to a non-default BWP may be: The determining module 1410 is configured to switch the BWP of the second cell from the default BWP to the non-default BWP used last time. For example, referring to FIG. 13, the terminal currently works on a default BWP 6, and before that, the terminal works on a non-default BWP 5. If a BWP of the terminal in a cell 2 needs to be switched to a non-default BWP, the BWP of the terminal in the cell 2 may be switched from the default BWP 6 to the non-default BWP 5 used last time. Correspondingly, the base station switches the BWP of the terminal in the cell 2 from the default BWP 6 to the non-default BWP 5 used in last communication with the terminal.

In a possible design, that the determining module 1410 is configured to switch a BWP of the second cell in the cell group from a first BWP to a second BWP may be specifically: The determining module 1410 is configured to: control the sending module 1420 to send a first switching indication, where the first switching indication carries a target non-default BWP; and switch the BWP of the second cell in the cell group from a default BWP of the second cell to the target non-default BWP.

In a possible design, that the determining module 1410 is configured to determine BWP switching or a deactivated state of the second cell in the cell group based on BWP switching or a deactivated state of the first cell in the cell group may be specifically: The determining module 1410 is configured to: if it is determined to deactivate the first cell in the cell group, deactivate the second cell in the cell group.

In a possible design, the sending module 1420 is further configured to send a first indication message to the terminal, where the first indication message is used to enable deactivating the second cell in the cell group when the first cell in the cell group is deactivated.

In a possible design, the sending module 1420 is further configured to send a deactivation indication specific to the first cell to the terminal, to indicate whether the first cell needs to be deactivated.

Optionally, the deactivation indication includes a media access control element MAC CE, radio resource control RRC, or downlink control information DCI.

In a possible design, that the determining module 1410 is configured to determine BWP switching or a deactivated state of the second cell in the cell group based on BWP switching or a deactivated state of the first cell in the cell group may be specifically: The determining module 1410 is configured to: if it is determined to switch a BWP of the first cell in the cell group from a non-default BWP of the first cell to a default BWP of the first cell, deactivate the second cell in the cell group.

In a possible design, the sending module 1420 is further configured to send a second indication message to the terminal, where the indication message is used to enable deactivating the second cell in the cell group when the BWP of the first cell in the cell group is switched from the non-default BWP to the default BWP.

In a possible design, the sending module 1420 is further configured to send a BWP switching indication to the terminal, where the BWP switching indication is used to indicate whether the BWP of the first cell needs to be switched from the non-default BWP of the first cell to the default BWP of the first cell.

Optionally, the BWP switching indication includes any one of a MAC CE, RRC, or DCI.

In the embodiments of this application, division into the modules is an example, is only logical function division, and may be other division in an actual implementation. In addition, function modules in the embodiments of this application may be integrated into one processor, or may exist alone physically, or two or more modules are integrated into one module. The integrated module may be implemented in a form of hardware, or may be implemented in a form of a software functional module.

Figure 16:
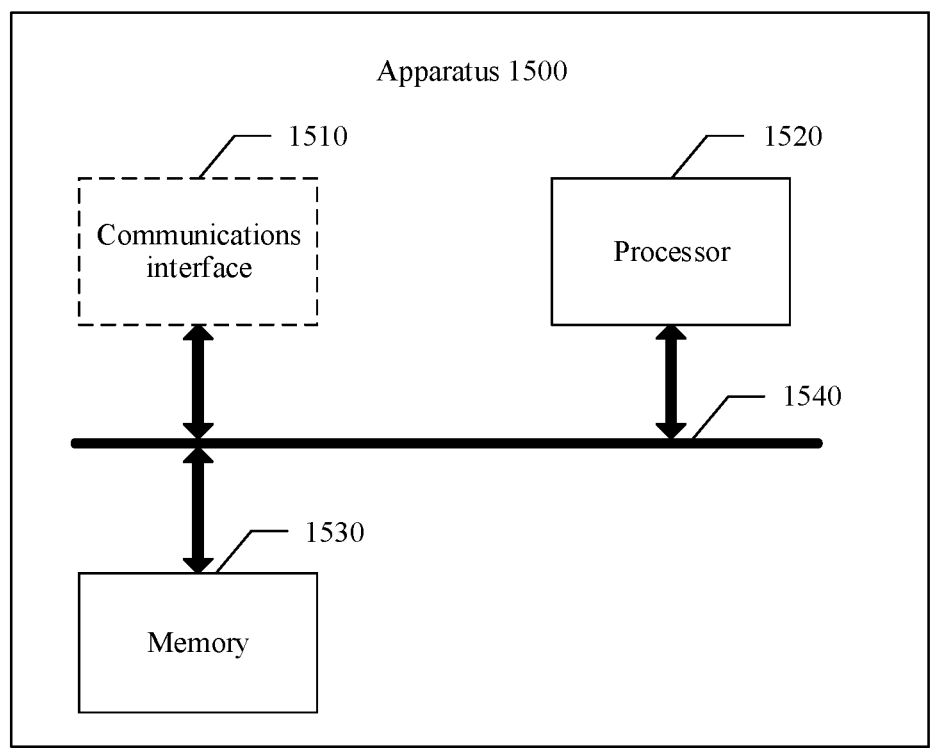
FIG. 16 is a schematic structural diagram 3 of a communications apparatus according to an embodiment of this application.

FIG. 16 is a schematic structural diagram of a communications apparatus according to this application. The communications apparatus is configured to implement a function of a terminal or an access network device in the foregoing method. The apparatus 1500 may be a terminal, or may be an apparatus that can support a terminal in implementing a function of the terminal, for example, may be an apparatus in the terminal. The apparatus 1500 may be a chip system in the terminal. The apparatus 1500 may alternatively be an access network device, or may be an apparatus that can support an access network device in implementing a function of the access network device, for example, may be an apparatus in the access network device. For example, the apparatus 1500 is a chip system in the access network device. In this embodiment of this application, the chip system may include a chip, or may include a chip and another discrete component.

When the apparatus 1500 is configured to implement the function of the terminal, the apparatus 1500 includes at least one processor 1520, configured to implement an action performed by the determining module in the terminal in the foregoing embodiment. For example, the processor may perform S303 in FIG. 3, S3031 in FIG. 4, and other actions of the terminal in the embodiments of this application.

When the apparatus 1500 is configured to implement the function of the access network device, at least one processor 1520 in the apparatus 1500 is configured to implement an action performed by the determining module in the access network device in the foregoing embodiment. For example, the processor may perform S302 in FIG. 3, S3021 in FIG. 4, and other actions of the access network device in the embodiments of this application.

The apparatus 1500 may further include at least one memory 1530, configured to store program instructions and/or data. The memory 1530 is coupled to the processor 1520. Coupling in this embodiment of this application may be indirect coupling or a communication connection between apparatuses, units, or modules in an electrical form, a mechanical form, or another form, and is used for information exchange between the apparatuses, the units, or the modules. The processor 1520 may operate in collaboration with the memory 1530. The processor 1520 may execute the program instruction stored in the memory 1530. At least one of the at least one memory may be included in the processor.

The apparatus 1500 may further include a communications interface 1510, configured to communicate with another device through a transmission medium, so that an apparatus in the apparatus 1500 can communicate with the another device. The communications interface may be a transceiver having a data sending and receiving function, or may be a transmitter having a data sending function, or may be a receiver having a data receiving function, or may be a circuit having a data sending and receiving function, or may be another apparatus capable of implementing a sending and receiving function. The communications interface may be a module, a circuit, a bus, or an interface in another form. This is not limited in this embodiment of this application.

When the apparatus 1500 is configured to implement a function of the foregoing terminal, for example, the another device may be the access network device. The processor 1520 receives and sends data through the communications interface 1510, and is configured to implement the method performed by the terminal in the foregoing embodiments corresponding to FIG. 3 to FIG. 6, for example, is configured to perform S301 in FIG. 3 and FIG. 4.

When the apparatus 1500 is configured to implement a function of the foregoing access network device, for example, the another device may be the terminal. The processor 1520 receives and sends data through the communications interface 1510, and is configured to implement the method performed by the access network device in the foregoing embodiments corresponding to FIG. 3 to FIG. 6, for example, is configured to perform S301 in FIG. 3 and FIG. 4.

This embodiment of this application does not limit a specific connection medium between the communications interface 1510, the processor 1520, and the memory 1530. In this embodiment of this application, the memory 1530, the processor 1520, and the communications interface 1510 are connected through a bus 1540 in FIG. 16, and the bus is represented by a bold line in FIG. 16. A manner of connection between other components is schematically described, and is not limited thereto. The bus may be classified into an address bus, a data bus, a control bus, and the like. For ease of representation, only one bold line is used to represent the bus in FIG. 16, but this does not mean that there is only one bus or only one type of bus.

In this embodiment of this application, the processor may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor, any conventional processor, or the like. The steps of the methods disclosed with reference to the embodiments of this application may be directly performed by a hardware processor, or may be performed by a combination of hardware and software modules in the processor.

In the embodiments of this application, the memory may be a nonvolatile memory such as a hard disk drive (HDD) or a solid-state drive (SSD), or may be a volatile memory such as a random-access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store program instructions and/or data.

All or some of the foregoing methods in the embodiments of this application may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, a network device, user equipment, or another programmable apparatus.

The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the scope of this application. In this way, this application is intended to cover these modifications and variations of this application provided that they fall within the scope of the claims of this application and equivalent technologies thereof.

What is claimed is:

1. An apparatus comprising:
   a communications interface;
   a non-transitory memory storage comprising computer-executable instructions; and
   one or more processors in communication with the communications interface and to the non-transitory memory storage, wherein the one or more processors execute the computer-executable instructions to cause the apparatus to perform operations comprising:
      receiving information about one or more cell groups, wherein one cell group comprises one first cell and at least one second cell; and
      for the cell group, determining carrier bandwidth part (BWP) switching or a deactivated state of the at least one second cell in the cell group based on BWP switching or a deactivated state of the first cell in the cell group, including switching a BWP of the at least one second cell in the cell group from a default BWP of the at least one second cell to a non-default BWP of the at least one second cell in response to determining to switch a BWP of the first cell in the cell group from a first BWP of the first cell to a second BWP of the first cell,
      wherein switching the BWP of the at least one second cell in the cell group from the default BWP to the non-default BWP comprises receiving a switching indication of the at least one second cell, and
      wherein the switching indication identifies the non-default BWP.

2. The apparatus according to claim 1, wherein the non-default BWP is a preconfigured BWP or a non-default BWP last used.

3. The apparatus according to claim 1, wherein determining the BWP switching or the deactivated state of the at least one second cell in the cell group comprises:
   in response to determining to deactivate the first cell in the cell group, deactivating the at least one second cell in the cell group.

4. The apparatus according to claim 3, wherein the operations further comprise:
   after receiving a deactivation indication of the first cell in the cell group or after receiving a deactivation timer of the first cell expires, stopping the sending of channel state information (CSI), wherein the deactivation indication is used to indicate to deactivate the first cell.

5. The apparatus according to claim 4, wherein the deactivation indication comprises a media access control s control element (MAC CE), radio resource control (RRC) signaling, or downlink control information (DCI).

6. The apparatus according to claim 1, wherein determining the BWP switching or the deactivated state of the at least one second cell in the cell group comprises:
   in response to determining to switch a BWP of the first cell in the cell group from a non-default BWP of the first cell to a default BWP of the first cell, deactivating the at least one second cell in the cell group.

7. The apparatus according to claim 6, wherein the operations further comprise:
   receiving an indication message, wherein the indication message is used to enable deactivating the at least one second cell in the cell group in response to the BWP of the first cell in the cell group being switched from the non-default BWP to the default BWP.

8. The apparatus according to claim 6, wherein the operations further comprise:
   after a BWP switching indication is received or after a BWP fallback timer of the first cell expires, stopping the sending of channel state information (CSI) of the at least one second cell in the cell group, wherein the BWP switching indication is used to switch the BWP of the first cell from the non-default BWP of the first cell to the default BWP of the first cell.

9. A communications method applied to an access network device, the method comprising:
   sending information about one or more cell groups, wherein one cell group comprises one first cell and at least one second cell; and
   for the cell group, determining carrier bandwidth part (BWP) switching or a deactivated state of the at least one second cell in the cell group based on BWP switching or a deactivated state of the first cell in the cell group, including switching a BWP of the at least one second cell in the cell group from a default BWP of the at least one second cell to a non-default second BWP of the at least one second cell in response to determining to switch a BWP of the first cell in the cell group from a first BWP of the first cell to a second BWP of the first cell,
   wherein switching the BWP of the at least one second cell in the cell group from the default BWP to the non-default second BWP comprises receiving a switching indication of the at least one second cell, and
   wherein the switching indication identifies the non-default BWP.

10. The communications method according to claim 9, wherein the non-default BWP is a preconfigured BWP or a non-default BWP last used.

11. The communications method according to claim 9, wherein determining the BWP switching or the deactivated state of the at least one second cell in the cell group comprises:
   in response to determining to deactivate the first cell in the cell group, deactivating the at least one second cell in the cell group.

12. The communication method according to claim 11, further comprising:

after receiving a deactivation indication of the first cell in the cell group or after receiving a deactivation timer of the first cell expires, stopping the sending of channel state information (CSI), wherein the deactivation indication is used to indicate to deactivate the first cell.

13. The communications method according to claim 9, wherein the determining the BWP switching or the deactivated state of the at least one second cell in the cell group comprises:
in response to determining to switch a BWP of the first cell in the cell group from a non-default BWP of the first cell to a default BWP of the first cell, deactivating the at least one second cell in the cell group.

14. The communications method according to claim 13, further comprising:
receiving an indication message, wherein the indication message is used to enable deactivating the at least one second cell in the cell group in response to the BWP of the first cell in the cell group being switched from the non-default BWP to the default BWP.

15. The communications method according to claim 13, further comprising:
after a BWP switching indication is received or after a BWP fallback timer of the first cell expires, stopping the sending of channel state information (CSI) of the at least one second cell in the cell group, wherein the BWP switching indication is used to switch the BWP of the first cell from the non-default BWP of the first cell to the default BWP of the first cell.

16. An apparatus comprising:
a communications interface;
a non-transitory memory storage comprising computer-executable instructions; and
one or more processors in communication with the communications interface and to the non-transitory memory storage, wherein the one or more processors execute the computer-executable instructions to cause the apparatus to perform operations comprising:
sending information about one or more cell groups, wherein one cell group comprises one first cell and at least one second cell; and
for the cell group, determining carrier bandwidth part (BWP) switching or a deactivated state of the at least one second cell in the cell group based on BWP switching or a deactivated state of the first cell in the cell group, including switching a BWP of the at least one second cell in the cell group from a default BWP of the at least one second cell to a non-default BWP of the at least one second cell in response to determining to switch a BWP of the first cell in the cell group from a first BWP of the first cell to a second BWP of the first cell,
wherein switching the BWP of the at least one second cell in the cell group from the default BWP to the non-default BWP comprises receiving a switching indication of the at least one second cell, and
wherein the switching indication identifies the non-default BWP.

17. The apparatus according to claim 16, wherein determining the BWP switching or the deactivated state of the at least one second cell in the cell group comprises:
in response to determining to deactivate the first cell in the cell group, deactivating the at least one second cell in the cell group.

18. The apparatus according to claim 17, wherein the operations further comprise:
after receiving a deactivation indication of the first cell in the cell group or after receiving a deactivation timer of the first cell expires, stopping the sending of channel state information (CSI), wherein the deactivation indication is used to indicate to deactivate the first cell.

19. The apparatus according to claim 16, wherein determining the BWP switching or the deactivated state of the at least one second cell in the cell group comprises:
in response to determining to switch a BWP of the first cell in the cell group from a non-default BWP of the first cell to a default BWP of the first cell, deactivating the at least one second cell in the cell group.

20. The apparatus according to claim 19, wherein the operations further comprise:
receiving an indication message, wherein the indication message is used to enable deactivating the at least one second cell in the cell group in response to the BWP of the first cell in the cell group being switched from the non-default BWP to the default BWP; or
after a BWP switching indication is received or after a BWP fallback timer of the first cell expires, stopping the sending of channel state information (CSI) of the at least one second cell in the cell group, wherein the BWP switching indication is used to switch the BWP of the first cell from the non-default BWP of the first cell to the default BWP of the first cell.

* * * * *

UNITED STATES PATENT AND TRADEMARK OFFICE
CERTIFICATE OF CORRECTION

| | |
|---|---|
| PATENT NO. | : 12,021,794 B2 |
| APPLICATION NO. | : 17/372058 |
| DATED | : June 25, 2024 |
| INVENTOR(S) | : Xiao et al. |

Page 1 of 1

It is certified that error appears in the above-identified patent and that said Letters Patent is hereby corrected as shown below:

In the Claims

Claim 5: Column 40, Lines 7-8: read as "deactivation indication comprises a media access control s control element (MAC CE), radio resource control (RRC)" should read as -- deactivation indication comprises a media access control, control element (MAC CE), radio resource control (RRC) --.

Signed and Sealed this
Twenty-second Day of April, 2025

Coke Morgan Stewart
*Acting Director of the United States Patent and Trademark Office*